US011001690B2

(12) United States Patent
Ichimura et al.

(10) Patent No.: US 11,001,690 B2
(45) Date of Patent: May 11, 2021

(54) CUSHION MATERIAL, SEAT CUSHION MATERIAL, AND SEAT

(71) Applicant: NHK SPRING CO., LTD., Yokohama (JP)

(72) Inventors: Shigeki Ichimura, Yokohama (JP); Kunikazu Takiwaki, Yokohama (JP); Kunio Asobe, Yokohama (JP); Hiroyuki Orito, Yokohama (JP); Takaharu Matsuo, Yokohama (JP); Kiyoshi Ota, Yokohama (JP); Hitoshi Komatsu, Yokohama (JP); Taiki Futamura, Yokohama (JP); Toshiharu Sato, Yokohama (JP)

(73) Assignee: NHK SPRING Co., Ltd., Yokohama (JP)

(*) Notice: Subject to any disclaimer, the term of this patent is extended or adjusted under 35 U.S.C. 154(b) by 178 days.

(21) Appl. No.: 16/029,294

(22) Filed: Jul. 6, 2018

(65) Prior Publication Data
US 2019/0010301 A1     Jan. 10, 2019

(30) Foreign Application Priority Data

Jul. 10, 2017  (JP) ............................. JP2017-134992
Dec. 15, 2017  (JP) ............................. JP2017-240684

(51) Int. Cl.
| | | |
|---|---|---|
| *C08J 9/12* | (2006.01) | |
| *C08G 18/48* | (2006.01) | |
| *C08G 18/20* | (2006.01) | |
| *C08G 18/18* | (2006.01) | |
| *B60N 2/70* | (2006.01) | |
| *C08G 18/76* | (2006.01) | |
| *C08G 18/10* | (2006.01) | |

(52) U.S. Cl.
CPC ................ *C08J 9/125* (2013.01); *B60N 2/70* (2013.01); *C08G 18/10* (2013.01); *C08G 18/1833* (2013.01); *C08G 18/2063* (2013.01); *C08G 18/4829* (2013.01); *C08G 18/7621* (2013.01); *C08G 18/7664* (2013.01); *C08G 18/7671* (2013.01); *C08G 2110/0058* (2021.01); *C08G 2110/0083* (2021.01); *C08J 2203/10* (2013.01); *C08J 2207/00* (2013.01); *C08J 2375/04* (2013.01)

(58) Field of Classification Search
CPC ...... B60N 2/70; C08G 18/10; C08G 18/1833; C08G 18/2063; C08G 18/4829; C08G 18/7607; C08G 18/7614; C08G 18/7621; C08G 18/7664; C08G 18/7671; C08G 2101/0058; C08G 2101/0083; C08J 9/125; C08J 2203/10; C08J 2207/00; C08J 2375/04
See application file for complete search history.

(56) References Cited

U.S. PATENT DOCUMENTS

| | | | |
|---|---|---|---|
| 5,374,667 A | 12/1994 | Hinz et al. | |
| 2003/0114550 A1* | 6/2003 | Toyota | ............... C08G 18/4072 521/155 |
| 2004/0254256 A1* | 12/2004 | Lockwood | ......... C08G 18/1833 521/174 |
| 2015/0069810 A1* | 3/2015 | Yamasaki | ............ B60N 2/7017 297/391 |
| 2016/0250786 A1* | 9/2016 | Murata | ................ C08G 18/632 264/46.4 |

FOREIGN PATENT DOCUMENTS

| | | |
|---|---|---|
| JP | A S60-219018 | 11/1985 |
| JP | B H04-034496 | 6/1992 |
| JP | H05-271378 A | 10/1993 |
| JP | A H06-106627 | 4/1994 |
| JP | A 2008-247996 | 10/2008 |
| JP | A 2010-280855 | 12/2010 |
| JP | 2011046907 A | 3/2011 |
| JP | 5242322 B2 | 7/2013 |
| JP | 2013-541630 A | 11/2013 |
| JP | 2014-528993 A | 10/2014 |
| JP | 5846714 B2 | 1/2016 |

OTHER PUBLICATIONS

Japanese Office Action dated Feb. 5, 2018 in Japanese Patent Application No. 2017-134992 in 8 pages (English translation included).
Explanation of Circumstances Related to Accelerated Examination issued on Nov. 26, 2018 in Japanese Patent Application No. 2017-134992 (English Translation included).
Explanation of Circumstances Related to Accelerated Examination issued on Nov. 26, 2018 in Japanese Patent Application No. 2017-240684 (English Translation included).

* cited by examiner

*Primary Examiner* — John M Cooney
(74) *Attorney, Agent, or Firm* — Knobbe, Martens, Olson & Bear, LLP

(57) ABSTRACT

Provided is a foamed urethane containing a cushion material, the foamed urethane containing a hard segment and a soft segment, in which the foamed urethane is a reaction cured product formed using an isocyanate component of an MDI compound. In a first aspect, a spin-spin relaxation time (T2) of the hard segment in the foamed urethane is from 20 μsec to 40 μsec, and a volume abundance ratio of the hard segment is from 5% to 40%. In a second aspect, a foamed urethane includes: a first region in which T2 of the hard segment is from 30 μsec to 40 μsec, and a volume abundance ratio of the hard segment is from 10% to 40%, and a second region in which T2 of the hard segment is from 20 μsec to less than 30 μsec, and a volume abundance ratio of the hard segment is from 5% to 40% in a $H^1$ solid-state pulse NMR measurement, and which is adjacent to the first region.

12 Claims, 6 Drawing Sheets

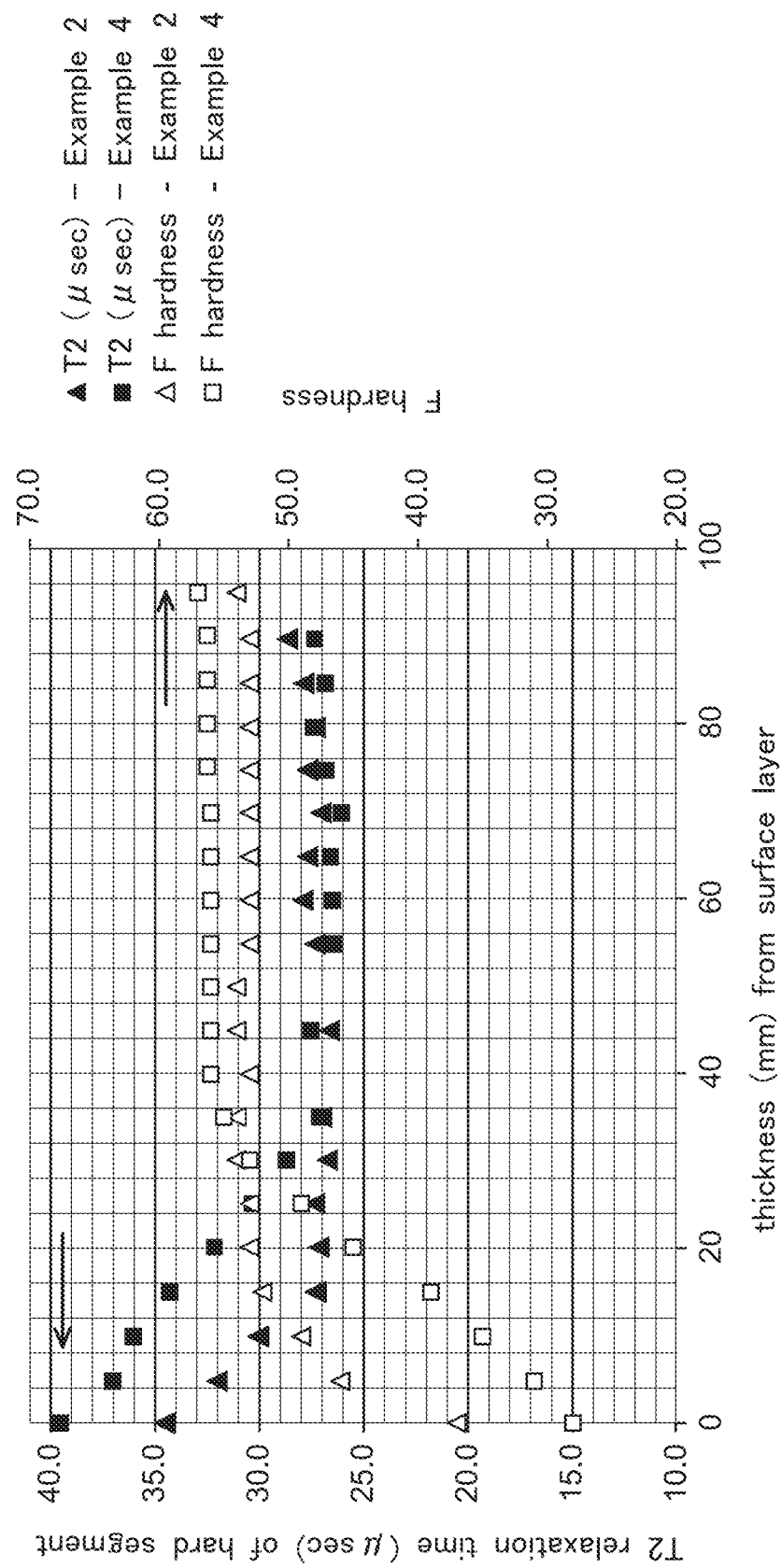

CUSHION MATERIAL, SEAT CUSHION MATERIAL, AND SEAT

CROSS-REFERENCE TO RELATED APPLICATION

This application claims priority under 35 USC 119 from Japanese Patent Application No. 2017-134992 filed on Jul. 10, 2017, and Japanese Patent Application No. 2017-240684 filed on Dec. 15, 2017, the disclosures of which are incorporated by reference herein in their entirely.

BACKGROUND OF THE INVENTION

Field of the Invention

The present disclosure relates to a cushion material, a seat cushion material, and a seat.

Description of the Related Art

Foamed urethane is used for a variety of applications (for example, see Japanese Patent Application Laid-Open (JP-A) No. 2010-280855, JP-A No. 2008-247996, Japanese Patent No. 5242322, and Japanese Patent No. 5846714). Foamed urethane is used, for example, as a cushion material. For cushion materials, cushion materials having portions having different hardnesses are known (for example, see Japanese Patent No. S60-219018. JP-A No. H06-106627, and Japanese Patent Publication (JP-B) No. H04-034496).

For example, JP-A No. 2010-280855 discloses a soft polyurethane foam for an automobile seat cushion obtained by mixing a diphenylmethane diisocyanate polyisocyanate (A) and a polyol component (B) in the presence of a catalyst (C), a foam stabilizer (D), and a foaming agent (E) and by injecting the mixture into a mold. It is disclosed that the difference between the core density and the total density of the soft polyurethane foam for an automobile seat cushion is 5 kg/m$^3$ or less.

JP-A No. 2008-247996 discloses a polyisocyanate composition containing a reaction product of a diphenylmethane diisocyanate (A) having a 2,4'-diphenylmethane diisocyanate content of from 55 to 90% by mass and a polyoxyethylene polyoxypropylene polyol (B) having an oxyethylene content of from 1 to 40% by mass, an average hydroxyl equivalent weight of from 700 to 2,500, and a nominal average number of functional groups of from 2 to 6. It is disclosed that the reaction product has an isocyanate group content of from 15 to 30% by mass.

Japanese Patent No. 5242322 discloses a polishing pad including a polishing layer made of a polyurethane resin formed by reaction of an isocyanate group-containing compound and a polyamine compound, and cells are formed substantially evenly in the polishing layer. It is disclosed that, in this polishing pad, the polyurethane resin constituting the polishing layer includes a crystal phase formed by a hard segment, an amorphous phase formed by a soft segment, and an interface phase between the crystal phase and the amorphous phase. Further, it is disclosed that, in this polishing pad, a P value obtained by P=22500-160·RI-21·T2I is in the range of from 6000 to 7500 when the component ratio of the interface phase obtained from a free induction decay signal by a pulse nuclear magnetic resonance method in an environment of a temperature of 120° C. is RI (%) and a spin-spin relaxation time is T2I (μs).

Japanese Patent No. 5846714 discloses a polishing pad having a polishing layer made of a foamed urethane containing a hard segment and a soft segment. It is disclosed that, in this polishing pad, the abundance ratio of the hard segment in the foamed urethane at 24° C. by pulse NMR measurement is from 61.9% to 68.8%.

For example, Japanese Patent No. S60-219018 discloses a laminated cushion body. This laminated cushion body is produced by one or more partition plates being inserted into a mold, different foaming materials being injected into the mold with the partition plate as a boundary, and then the partition plate being pulled out according to the foaming rate.

JP-A No. H06-106627 discloses a different hardness foamed cushion body. In this different hardness foamed cushion body, at least foamed urethanes having different hardnesses are directly bonded to each other through an opening portion of a hot melt synthetic resin film in which numerous slits have been opened by heating during foaming.

JP-B No. H04-034496 discloses a different hardness cushion body in which portions having different hardnesses are formed. This different hardness cushion body is formed by bonding fibers of a cotton-like fiber aggregate, in which fibers are three-dimensionally entangled, with each other by a urethane-based binder. At the same time, a portion of the cushion body is packed with a fiber aggregate and bonded with a binder.

SUMMARY OF THE INVENTION

A first aspect of the disclosure relates to a cushion material, a vehicle seat cushion material, and a car seat cushion material, which are excellent in durability over time.

A second aspect of the disclosure relates to a seat cushion material, a vehicle seat cushion material, a car seat cushion material, and a seat, which are excellent in riding comfort.

The cushion material according to the first aspect includes the following.

<1> A cushion material including
a foamed urethane containing a hard segment and a soft segment,
wherein the foamed urethane is a reaction cured product formed using an isocyanate component of a diphenylmethane diisocyanate compound, and
the spin-spin relaxation time T2 of the hard segment in the foamed urethane is from 20 μsec to 40 μsec and the volume abundance ratio of the hard segment is from 5% to 40% in the H$^1$ solid-state pulse NMR measurement.

<2> A cushion material including
a foamed urethane containing a hard segment and a soft segment,
wherein the foamed urethane is a reaction cured product formed using an isocyanate component of a diphenylmethane diisocyanate compound, and
the compression permanent set of the foamed urethane after 50% compression for 22 hours under conditions of a temperature of 50° C. and a relative humidity of 95% is 1% or less.

<3> The cushion material according to <1> or <2>,
wherein the isocyanate component is an isocyanate terminal-modified polyisocyanate obtained by reacting a mixture of monomeric diphenylmethane diisocyanate and polymeric diphenylmethane diisocyanate with a portion of a polyol component.

<4> The cushion material according to any one of <1> to <3>,
wherein the cushion material is a vehicle seat cushion material.

<5> The cushion material according to any one of <1> to <4>, wherein the cushion material is a car seat cushion material.

The seat cushion material and seat according to the second aspect include the following.

<6> A seat cushion material including a foamed urethane which is a reaction cured product formed using an isocyanate component of a diphenylmethane diisocyanate compound and which includes a hard segment and a soft segment, wherein the foamed urethane includes:

a first region in which the spin-spin relaxation time T2 of the hard segment is from 30 μsec to 40 μsec and the volume abundance ratio of the hard segment is from 10% to 40% in the $H^1$ solid-state pulse NMR measurement; and a second region in which the spin-spin relaxation time T2 of the hard segment is from 20 μsec to less than 30 μsec and the volume abundance ratio of the hard segment is from 5% to 40% in the $H^1$ solid-state pulse NMR measurement, which is adjacent to the first region.

<7> The seat cushion material according to <6>, wherein the Asker F hardness of the first region is from 20 to less than 50 and the Asker F hardness of the second region is from 50 to 70.

<8> The seat cushion material according to <7>, wherein when the Asker F hardness in the first region is F1 and the Asker F hardness in the second region is F2, the absolute value of the difference between F1 and F2 is from 10 to 50.

<9> The seat cushion material according to any one of <6> to <8>, wherein the isocyanate component includes an isocyanate terminal-modified polyisocyanate obtained by reacting a mixture of monomeric diphenylmethane diisocyanate and polymeric diphenylmethane diisocyanate with a portion of a polyol component.

<10> The seat cushion material according to any one of <6> to <9>, wherein the seat cushion material is for vehicles.

<11> The seat cushion material according to any one of <6> to <10>, wherein the seat cushion material is for cars.

<12> A seat including:

a seat portion for supporting buttocks of a seated occupant; and a backrest portion for supporting a back portion and a waist portion of a seated occupant, wherein at least one of the seat portion and the backrest portion includes the seat cushion material according to any one of <6> to <11>.

According to the first aspect, a cushion material, a vehicle seat cushion material, and a car seat cushion material, which are excellent in durability over time, are provided.

According to the second aspect, a seat cushion material, a vehicle seat cushion material, a car seat cushion material, and a seat, which are excellent in riding comfort, are provided.

BRIEF DESCRIPTION OF DRAWINGS

FIG. 6 is a graph showing the relationship between the thickness of a foamed urethane from the surface and the spin-spin relaxation time (T2) and the relationship between the thickness of a foamed urethane from the surface and the Asker F hardness in Examples B2 and B4.

DETAILED DESCRIPTION OF THE INVENTION

Figure 1:
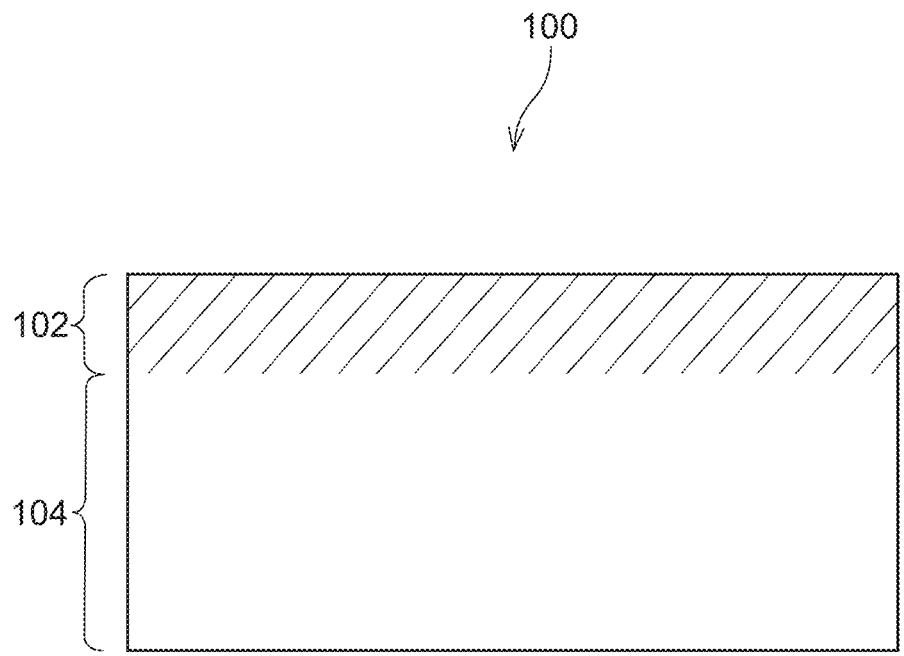
FIG. 1 is a cross-sectional view showing an example of a seat cushion material according to the second aspect.

Hereinafter, an embodiment which is an example of the cushion material according to the first aspect of the disclosure will be described. In the disclosure, the explanation of the term "first aspect" applies to both the cushion material A according to the first aspect and the cushion material B according to the first aspect unless otherwise specified.

The cushion material A according to the first aspect of the disclosure includes a foamed urethane including a hard segment and a soft segment. This foamed urethane is a reaction cured product formed using an isocyanate component of a diphenylmethane diisocyanate compound. The foamed urethane has characteristics that the spin-spin relaxation time (T2) of the hard segment is from 20 μsec to 40 μsec and the volume abundance ratio of the hard segment is from 5% to 40% in the $H^1$ solid-state pulse NMR measurement. In other words, the hard segment of the foamed urethane has a spin-spin relaxation time (T2) of from 20 μsec to 40 μsec and a volume abundance ratio of from 5% to 40% in the $H^1$ solid-state pulse NMR measurement.

The cushion material B according to the first aspect of the disclosure includes a foamed urethane containing a hard segment and a soft segment. This foamed urethane is a reaction cured product formed using an isocyanate component of a diphenylmethane diisocyanate compound. The foamed urethane has a characteristic that the compression permanent set after 50% compression for 22 hours under conditions of a temperature of 50° C. and a relative humidity of 95% is 1% or less.

It is known that a foamed urethane has been conventionally applied to a variety of cushion materials such as a cushion material for a vehicle seat such as a car seat, a cushion material for furniture, a cushion material for office chairs, a cushion material for a bedding mattress.

One of the characteristics required for cushion material is durability over time. Especially when a foamed urethane is applied to a vehicle seat cushion material, durability over time is demanded for the vehicle seat cushion material. When the durability of a cushion material over time is low, retention of a variety of physical properties related to riding comfort (or comfortability) such as vibration absorbing property, impact resilience, or load deflection properties is greatly affected.

For example, a foamed urethane used as a cushion material for a vehicle seat such as a car seat is demanded to have improved comfortability while maintaining flexible cushioning property at an appropriate expansion ratio (about 60 kg/m³). In order to meet this demand, the ratio of hard segments in a foamed urethane is increased.

A hard segment has a high melting point or a high glass transition temperature. For this reason, a hard segment contributes to high modulus and high strength. A hard segment is a portion which develops the physical properties and strength over time from the initial stage of a foamed urethane (immediately after production of the foamed urethane).

When the composition forming this hard segment is a urea-bonded aggregate, hydrogen bonds (non-covalent bonds) are formed at the interface between urea bonds, and therefore a variety of initial physical properties immediately after production of a foamed urethane are favorable. However, it is considered that under moist heat compression used for a long time under occupant's buttocks or the like, moisture intervenes in hydrogen bonding and shear deformation easily occurs at each interface between urea bonds in a urea-bonded aggregate (part of a hard segment) subjected to local shear compression.

On the other hand, a soft segment has a glass transition temperature lower than room temperature. For this reason, a soft segment contributes to high elongation and elastic recovery. The soft segment is a portion that develops the flexibility of a foamed urethane.

The durability of a cushion material over time reflects a practical use environment of, for example, a vehicle seat, and a hygrothermal compression permanent set (compression permanent set after 50% compression for 22 hours under conditions of a temperature of 50° C. and a relative humidity of 95%) is known as a reliability test over time under a condition of a hygrothermal load simultaneously with a compressive load. By measuring a final thickness change (permanent set) of a cushion material, changes in vibration absorbing property, impact resilience, load deflection properties (bottom tipping feeling), or the like can be predicted from a hygrothermal compression permanent set. In other words, a hygrothermal compression permanent set is an index for knowing the influence on comfortability when applied to a vehicle seat.

As an index showing the durability over time of a vehicle seat cushion material, it is desirable that the hygrothermal compression permanent set is small.

For example, a soft polyurethane foam for car seat cushion disclosed in JP-A No. 2010-280855 has low durability over time and further improvement is required.

For example, when a foamed urethane molded from a polyisocyanate composition disclosed in JP-A No. 2008-247996 is applied to furniture cushion materials, cushion materials for seats for cars such as automobiles and railroads, and cushion materials for bedding mattresses, the durability over time is low, and further improvement has been demanded. In particular, when polyurethane disclosed in JP-A No. 2008-247996 is applied to a car seat cushion material, comfortability is not sufficiently satisfied due to low durability over time, and improvement of durability over time has been demanded.

As described above, for a cushion material using a conventional foamed urethane, further improvement in durability over time has been demanded.

On the other hand, a foamed urethane disclosed in Japanese Patent No. 5242322, and Japanese Patent No. 5846714 is used for polishing pads. A foamed urethane used for such polishing pads does not have properties demanded for cushion materials, and is not suitable for application of cushion materials (in particular, vehicle seat cushion materials).

Here, a conventional foamed urethane is considered to have a large proportion of hard segments (for example, in a form of a large aggregate structure in which urea bonds are concentrated) in an air bubble resin (a portion forming a skeleton and a membrane) of the foamed urethane.

When a conventional foamed urethane is subjected to $H^1$ pulse NMR measurement in vacuum at 24° C., the spin-spin relaxation time (T2) of a hard segment obtained by $H^1$ pulse NMR (nuclear magnetic resonance) measurement in vacuum at 24° C. is less than 20 μsec. At this time, a conventional foamed urethane is considered to form a large aggregate structure in which urea bonds are densely formed (for example, a urea bond aggregate structure having a diameter of 10 nm or more). As the volume abundance ratio of the hard segment increases, it is considered that a structure having a large proportion of urea bond aggregate structures is formed.

In other words, when the spin-spin relaxation time (T2) of the hard segment of the foamed urethane is less than 20 μsec and the volume abundance ratio of the hard segment is large, it is presumed that a structure having a large number of large aggregate structures in which urea bonds are densely formed is formed.

When a shear load is applied to a conventional foamed urethane having such a structure, it is considered that a large misalignment occurs at a hydrogen bond (non-covalent bond) interface between urea bonds. As a result, a permanent set accompanying slippage occurs in each aggregate structure, and it is considered that each air bubble resin composed of the aggregate structure in which such a permanent deformation has occurred will also have a strain of permanent deformation. Therefore, it is presumed that a cushion material using a conventional foamed urethane has low durability over time.

In contrast, a cushion material A according to the first aspect is formed from a specific foamed urethane, the spin-spin relaxation time (T2) of a hard segment is from 20 μsec to 40 μsec and the volume abundance ratio thereof is from 5% to 40% in $H^1$ solid pulse NMR measurement under vacuum at 24° C. For this reason, it is considered that the number of large aggregate structures in which urea bonds are densely formed is small (or the number of hydrogen bonds (non-covalent bonds) between urea bonds is small) and a structure in which the number of urea bond aggregates is small is formed, and these are in a state close to monodispersity. As a result, it is considered that occurrence of shear permanent set is suppressed even when a shear load is applied to the cushion material A according to the first aspect. As a result, the cushion material A according to the first aspect is presumed to be suppressed in an element which deteriorates the durability over time, and to be excellent in durability over time.

The cushion material B according to the first aspect is formed from a specific foamed urethane, and the compression permanent set (hygrothermal compression permanent set) after 50% compression for 22 hours under conditions of a temperature of 50° C. and a relative humidity of 95% is 1% or less. Since the hygrothermal compression permanent set of a conventional cushion material using a foamed urethane exceeds, for example, 5%, the cushion material B according to the first aspect is superior in durability over time as compared with a cushion material using a conventional foamed urethane.

($H^1$ Solid-State Pulse NMR Measurement)

Here, the spin-spin relaxation time (T2) and the volume abundance ratio in the $H^1$ solid-state pulse NMR (Nuclear Magnetic Resonance) measurement will be described.

First, $H^1$ solid-state pulse NMR measurement will be described. In the first aspect, the $H^1$ solid-state pulse NMR measurement is carried out in a vacuum at 24° C., with a cushion material to be measured being vacuum dried overnight at room temperature and vacuum sealed as a test piece. Specific measurement conditions are as follows.

—Measurement Condition—

Measurement device: JNM-MU25 (resonance frequency 25 MHz) manufactured by JEOL Ltd.

Measurement method: Solid echo method
Measurement temperature: 24° C.
Pulse width: 90° pulse, 2.3 µs
Repetition time: 4 sec
Number of integrations: 32 times (foamed sample)

The analysis result (the spin-spin relaxation time (T2) and the volume abundance ratio of a hard segment) is presumed to be a numerical value of Variance of 25 or less. Variance represents the degree of data scattering and is expressed as the average of squares of deviations.

In the $H^1$ solid-state pulse NMR measurement, the amount of components of an object to be measured can be evaluated by utilizing the difference in relaxation time.

When an object to be measured is subjected to $H^1$ solid-state pulse NMR measurement, an FID (free induction decay) signal is obtained as a response to a pulse. An initial value of the FID signal is proportional to the number of protons in a measurement sample. When there are a plurality of components such as a hard segment and a soft segment, for example, the FID signal is the sum of the response signals of the respective components. The spin-spin relaxation time (T2) differs when the mobility varies depending on components. Therefore, by separating spin-spin relaxation times (T2), the relaxation time of each component and the ratio of each component (volume abundance ratio) can be obtained. As the mobility of a component decreases, the spin-spin relaxation time (T2) becomes shorter, and as the mobility increases, the spin-spin relaxation time (T2) becomes longer. In other words, the spin-spin relaxation time (T2) is shorter for harder components, and the spin-spin relaxation time (T2) is longer for soft components.

When a $H^1$ solid-state pulse NMR measurement is performed on a foamed urethane containing a hard segment and a soft segment, the hard segment and the soft segment have different spin-spin relaxation times (T2) because of their different mobilities. The hard segment has a short spin-spin relaxation time (T2), and the soft segment has a long spin-spin relaxation time (T2). In other words, as the formation of a urea bond aggregate structure progresses, the spin-spin relaxation time (T2) becomes shorter, and as the formation of a urea bond aggregate structure is suppressed, the spin-spin relaxation time (T2) becomes longer.

The larger the volume abundance ratio of the hard segment (or the more the urea bond aggregate structure is formed), the shorter the spin-spin relaxation time (T2) is.

From the above, that the spin-spin relaxation time (T2) of the hard segment is from 20 µsec to 40 µsec in the $H^1$ solid-state pulse NMR measurement under vacuum at 24° C. is considered to mean that there is a small number of hydrogen bonds between urea bonds in the urea bond aggregate structure in the foamed urethane (or there are a small number of large aggregate structures in which urea bonds are densely formed). At the same time, that the volume abundance ratio of the hard segment is from 5% to 40% is considered to be a structure in which the abundance ratio of hydrogen bonds between urea bonds in the urea bond aggregate structure (or the number of aggregate structures in which urea bonds are densely formed) is suppressed to be small.

The lower limit value of the spin-spin relaxation time (T2) of the hard segment is preferably 21 µsec or more, and more preferably 22 µsec or more. The upper limit value of the spin-spin relaxation time (T2) of the hard segment is preferably 39 µsec or less, and more preferably 38 µsec or less.

On the other hand, the lower limit value of the volume abundance ratio of the hard segment is preferably 10% or more, and more preferably 19% or more. An upper limit value of the volume abundance ratio of the hard segment is preferably 38% or less, and more preferably 35% or less.

(Hygrothermal Compression Permanent Set)

Next, hygrothermal compression permanent set will be described.

In the first aspect, the hygrothermal compression permanent set is a measurement of compression set after 50% compression for 22 hours under conditions of a temperature of 50° C. and a relative humidity of 95%.

Specifically, a cushion material to be measured is cut into a test piece of 40 mm+1 mm in thickness. The thickness (t0) of the test piece is measured, the test piece is compressed and fixed to 50% of the thickness thereof, and left for 22 hours in a high humidity thermostatic bath at 50° C. and 95% relative humidity. Then, the test piece in a fixed state is removed, and the thickness (t1) of the test piece after 30 minutes is measured. Then, the value obtained by the following Formula is taken as a value of hygrothermal compression permanent set.

$$\text{hygrothermal compression permanent set (\%)} = \{(t0-t1)/t0\} \times 100 \quad \text{(Formula)}$$

In the cushion material B according to the first aspect, the compression permanent set after 50% compression for 22 hours under conditions of a temperature of 50° C. and a relative humidity of 95% is 1% or less. The compression permanent set is preferably 0.8% or less, and more preferably 0.5% or less.

That the hygrothermal compression permanent set is 1% or less means that the compression set over time under hygrothermal conditions is suppressed low. Therefore, this means that more stable durability (for example, comfortability) over time can be obtained when the cushion material B according to the first aspect is applied to, for example, a vehicle cushion material.

The smaller the hygrothermal compression permanent set is, the better the durability (for example, comfortability) over time, and therefore, the lower limit value of the hygrothermal compression permanent set is preferably 0%, and the lower limit value is not particularly limited.

A foamed urethane which is a material of the cushion material according to the first aspect (including a cushion material A and a cushion material B) will be described below. The foamed urethane is an open-cell urethane foam.

The cushion material according to the first aspect includes a foamed urethane formed using an isocyanate component of a diphenylmethane diisocyanate compound. Specifically, the foamed urethane is a reaction cured product obtained by reacting and curing a mixed raw material of an isocyanate component of a diphenylmethane diisocyanate compound, a polyol component, a catalyst, and a foaming agent.

Particularly from the viewpoint of the durability (in particular, comfortability) of a cushion material over time, a foamed urethane is preferably a reaction cured product formed by using polyisocyanate component prepared by reacting a mixture of monomeric diphenylmethane diisocyanate and polymeric diphenylmethane diisocyanate with part of polyol in advance.

Each component for forming a foamed urethane will be described below.

(Isocyanate Component)

First, an isocyanate component of a diphenylmethane diisocyanate compound will be described. Hereinafter, diphenylmethane diisocyanate is sometimes referred to as "MDI".

The MDI compound is not particularly limited. Examples of the MDI compound include a pure diphenylmethane diisocyanate (monomeric MDI), a polymeric MDI, a mixture containing a monomeric MDI and a polymeric MDI, an isocyanate terminal-modified polyisocyanate of a polymeric MDI, and an isocyanate terminal-modified polyisocyanate containing a monomeric MDI and a polymeric MDI.

Specific examples thereof include a monomeric MDI of 2,2'-Diphenylmethane diisocyanate (2,2'-MDI), 2,4'-diphenylmethane diisocyanate (2,4'-MDI), 4,4'-diphenylmethane diisocyanate (4,4'-MDI), and a mixture thereof; a polymeric MDI of polymethylene polyphenylene polyisocyanate; a mixture of a monomeric MDI and a polymeric MDI; an isocyanate terminal-modified polyisocyanate obtained by reacting a monomeric MDI with a part of a polyol component; an isocyanate terminal-modified polyisocyanate obtained by reacting a polymeric MDI with a part of a polyol component; an isocyanate terminal-modified polyisocyanate obtained by reacting a mixture of a monomeric MDI and a polymeric MDI with a part of a polyol component; a mixture of an isocyanate terminal-modified polyisocyanate obtained by reacting a monomeric MDI with a part of a polyol component and an isocyanate terminal-modified polyisocyanate obtained by reacting a polymeric MDI with a part of a polyol component; and a mixture in which at least one of monomeric MDI and polymeric MDI is contained in an isocyanate terminal-modified polyisocyanate obtained by reacting a mixture of a monomeric MDI and a polymeric MDI with a part of a polyol component. These diphenylmethane diisocyanate compounds may be used singly, or two or more thereof may be used in combination.

From the viewpoint of excellent durability (comfortability) over time of a cushion material, more preferably, an MDI compound contains an isocyanate terminal-modified polyisocyanate obtained by reacting a mixture of a monomeric MDI and a polymeric MDI with a part of a polyol component (that is to say, a prepolymer obtained by reacting a mixture of a monomeric MDI and a polymeric MDI with a part of a polyol component) among the above. When such an isocyanate terminal-modified polyisocyanate is used, formation of urea bond aggregate structure is easily suppressed.

In an isocyanate terminal-modified polyisocyanate obtained by reacting a mixture of a monomeric MDI and a polymeric MDI with a part of a polyol component, the mixing ratio (mass ratio) of a monomeric MDI and a polymeric MDI is preferably in the range of from 3/7 to 9/1 as the ratio of the mass of the monomeric MDI to the mass of the polymeric MDI (monomeric MDI/polymeric MDI). The mixing ratio is more preferably in the range of from 4/6 to 8/2. When the MDI mixing ratio (mass ratio) of the monomeric MDI and the polymeric MDI is within the range of from 3/7 to 9/1, formation of a foam having characteristics deviating from a cushion material is suppressed. In addition, deterioration of moldability is suppressed.

The NCO content (% by mass) of an isocyanate terminal-modified polyisocyanate obtained by reacting a mixture of a monomeric MDI and a polymeric MDI with a part of a polyol component is preferably finally adjusted to be from 10 to 30.

(Polyol Component)

The polyol component is not particularly limited. In view of the fact that a cushion material according to the first aspect is sometimes applied to the use of a vehicle seat (in particular, a car seat), as the polyol component, an ether polyol which is hard to cause hydrolysis (excellent in hydrolysis resistance) is preferable. Specific examples of the ether-based polyol preferably include those having an —O— bond (ether bond) such as a PPG (polyoxypropylene polyol, polyoxyethylene polyol, or polyoxyethylene polyoxypropylene polyol), PTMG (polytetramethylene ether glycol), or PEG (polyethylene glycol).

The average molecular weight of the polyol component is preferably in the range of from 200 to 10,000 (preferably from 600 to 9000) in weight average molecular weight. The weight average molecular weight per functional group of an active hydrogen group (OH group) is preferably from 200 to 4,000 (preferably from 300 to 3,000).

(Catalyst)

The catalyst is not particularly limited, and a variety of urethanation catalysts known in the field of foamed urethane used as a cushion material can be used. Examples thereof include amine catalysts of amine compounds such as triethylamine, triethyldiamine, tripropylamine, tributylamine. N-methylmorpholine, N-ethylmorpholine, dimethylbenzylamine, N,N,N',N'-tetramethylhexamethylenediamine, N,N,N',N',N''-pentamethyldiethylenetriamine, bis-(2-dimethylaminoethyl) ether, triethylenediamine, 1,8-diaza-bicyclo (5,4,0) undecene-7,1,2-dimethylimidazole, dimethylethanolamine, N,N-dimethyl-N-hexanolamine; organic acid salts of these amine compounds; stannous octoate; organometallic compounds such as zinc naphthenate. Examples thereof also include an amine catalyst having an active hydrogen such as N,N-dimethylethanolamine, N,N-diethylethanolamine. These catalysts may be used singly, or two or more thereof may be used in combination.

The addition amount of the catalyst is preferably from 0.01% by mass to 10% by mass with respect to the polyol component. When the amount is 0.01% by mass or more, insufficient curing tends to be suppressed, and when the amount is 10% by mass or less, deterioration of moldability is suppressed.

(Foaming Agent)

Examples of the foaming agent include a foaming agent containing water, and preferably, water is singly used as the foaming agent.

The amount of water to be used as a foaming agent may be appropriately set depending on a desired expansion ratio with respect to 100 parts by mass of a polyol component.

When the foaming agent is used in combination with water, examples of the foaming agent other than water include a low boiling point organic compound such as methylene chloride, a hydrochlorofluorocarbon (such as HCFC-123), a hydrofluorocarbon (such as HFC-245fa), butane, pentane (cyclopentane, isopentane, and normal pentane); and an organic acid such as formic acid.

In addition to using a foaming agent containing water as a foaming agent, air, nitrogen gas, liquefied carbon dioxide or the like may be mixed and dissolved in a mixed raw material for obtaining a foamed urethane. The amount of the foaming agent other than water may be set according to a desired expansion ratio.

(Other Components)

The other components are components (additives) added if necessary. Examples of the other components include a crosslinking agent, a coloring agent, a filler, a flame retardant, an antioxidant, an ultraviolet absorber, an antistatic agent, and a foam stabilizer. When other components are used, these may be used singly or in combination of two or more thereof if necessary.

Next, a method of producing a foamed urethane to be used for the cushion material according to the first aspect will be described.

(Method of Producing Foamed Urethane)

In the cushion material according to the first aspect, the method of producing a foamed urethane is not particularly limited, and a known method of a slabstock method and a molding method of molding in a mold can be applied.

An example of a preferable production method of a foamed urethane is a method including a first step of preparing an isocyanate component of a diphenylmethane diisocyanate compound and a second step of molding a raw material obtained by mixing the isocyanate component, a polyol component, and a foaming agent.

As the first step, for example, it is preferable to prepare a polyisocyanate component prepared by mixing a mixture of a monomeric MDI and a polymeric MDI with a part of a polyol in advance (that is to say, an isocyanate terminal-modified polyisocyanate obtained by reacting a mixture of a monomeric MDI and a polymeric MDI with a part of a polyol component). The mixture ratio of the monomeric MDI and the polymeric MDI is preferably from 3/7 to 9/1 (mass ratio) as the mixing ratio of monomeric MDI/polymeric MDI. It is preferable to carry out adjustment such that the NCO content (% by mass) of the isocyanate group (NCO group) finally becomes from 10 to 30. The isocyanate component of the diphenylmethane diisocyanate compound is not limited to the isocyanate terminal-modified polyisocyanate obtained by reacting a mixture of a monomeric MDI and a polymeric MDI with a part of a polyol component, and an isocyanate component similar to the above-described isocyanate component may be used.

The second step is a step of molding a mixed raw material containing an isocyanate component, a polyol component, and a foaming agent prepared in the first step. Hereinafter, the second step will be described for a case of molding by a molding method in which molding is performed in a mold.

In the second step, the mixed raw material is poured into a mold and foamed at a predetermined temperature in a molding mold, whereby a reaction cured product of a foamed urethane can be obtained. The temperature of the molding mold when foaming is preferably in the range of from 30° C. to 50° C. (the lower limit is preferably 35° C. or more, and the upper limit is preferably 45° C. or less). When the temperature of the molding mold is in this range, it is easy to control the range of the spin-spin relaxation time (T2) of a hard segment to from 20 µsec to 40 µsec and the volume abundance ratio of a hard segment to from 5% to 40% in $H^1$ solid pulse NMR measurement at 24° C. Under conditions of a temperature of 50° C. and a relative humidity of 95%, it is easy to control the compression permanent set after 50% compression for 22 hours to 1% or less.

When the temperature of the molding mold during foam molding exceeds 50° C. (for example, 60° C. or more), a skin layer containing a urea bond aggregate structure is likely to be formed on the surface of a foamed urethane in contact with the mold inside the mold. Therefore, the durability (comfortability) over time tends to decrease.

In the second step, the mixed raw material may be prepared in the order that the catalyst and the foaming agent are previously mixed with the polyol component (premix) and then mixed with the isocyanate component prepared in the first step. The isocyanate component prepared in the first step may be mixed with the catalyst, the foaming agent, and the polyol component, respectively.

In the method of producing a foamed urethane, when moisture is present in the production environment of a foamed urethane in the first step and the second step, the isocyanate component of the diphenylmethane diisocyanate compound reacts with moisture, and a urea bond is likely to be formed. Therefore, it is preferable to produce a foamed urethane in a nitrogen purge atmosphere in all steps of the production process. In the nitrogen purge atmosphere, formation of a urea bond aggregate structure is easily suppressed.

In the disclosure, the term "step" means not only an independent step, but also a step which cannot be clearly distinguished from other steps, as long as an expected object of the step can be achieved therewith.

(Applications)

The cushion material according to the first aspect is applicable to a variety of cushion materials such as vehicle (ship, aircraft, or car) seat cushion materials, office chair cushion materials, bedding mattress cushion materials, or furniture cushion materials. In particular, since the cushion material according to the first aspect is excellent in durability (comfortability) over time, it is preferable to be applied as a vehicle seat cushion material. Among them, the cushion material is more preferably to be applied to car seat cushion materials. Examples of the car seat include automobile and railway seats. Other examples of the car seat include a seat for a car such as a cultivator, a tractor, a power shovel, a hydraulic crane, an excavator, or a bicycle.

Next, an embodiment which is an example of a seat cushion material according to the second aspect of the disclosure will be described.

<Seat Cushion Material>

The seat cushion material according to the second aspect of the disclosure includes a foamed urethane which is a reaction cured product formed using an isocyanate component of a diphenylmethane diisocyanate compound and which includes a hard segment and a soft segment.

The foamed urethane includes a first region in which the spin-spin relaxation time (T2) of the hard segment is from 30 µsec to 40 µsec and the volume abundance ratio of the hard segment is from 10% to 40% in the $H^1$ solid-state pulse NMR measurement.

The foamed urethane includes a second region in which the spin-spin relaxation time (T2) of the hard segment is from 20 µsec to less than 30 µsec and the volume abundance ratio of the hard segment is from 5% to 40% in the $H^1$ solid-state pulse NMR measurement, which is adjacent to the first region.

The seat cushion material according to the second aspect is used in such a manner that the first region is arranged on the side of the seated occupant and the second region is arranged on the side distant from the side of the seated occupant.

Here, an example of the seat cushion material according to the second aspect will be described with reference to the drawings.

FIG. 1 is a sectional view showing an example of a seat cushion material according to the second aspect. The seat cushion material 100 is formed of a foamed urethane. The foamed urethane is a reaction cured product formed using an isocyanate component of a diphenylmethane diisocyanate compound and includes a hard segment and a soft segment. In the seat cushion material 100, a first region 102 and a second region 104 adjacent to the first region 102 are formed. In the seat cushion material 100, the boundary between the first region 102 and the second region 104 is not clearly defined. The first region is a region arranged on the side of the seating surface. The second region is a region arranged on the side away from the side of the seating surface.

In the second aspect, the seating surface represents a surface on the side supporting the buttocks and a surface on the side supporting the back portion and the waist portion when an occupant is seated on the seat.

The first region 102 and the second region 104 show the following characteristics in $H^1$ solid-state pulse NMR measurement.

In the first region, the spin-spin relaxation time (T2) of the hard segment is from 30 μsec to 40 μsec, and the volume abundance ratio of the hard segment is from 10% to 40% in the $H^1$ solid pulse NMR measurement.

In the second region, the spin-spin relaxation time (T2) of the hard segment is from 20 μsec to less than 30 μsec, and the volume abundance ratio of the hard segment is from 5% to 40%.

In the seat cushion material 100, the boundary between the first region 102 and the second region 104 is ambiguous, but the invention is not limited thereto. The boundary between the first region 102 and the second region 104 may be ambiguous or may be clearly defined. The sectional shape of the seat cushion material 100 is not limited to the shape shown in FIG. 1, and may be formed in a shape according to a purpose. In the following description, reference numerals are omitted.

Conventionally, a foamed urethane is also applied to seat cushion materials for vehicles such as cars. A foamed urethane used as a vehicle seat cushion material is demanded to have improved riding comfort while maintaining flexible cushioning property at an appropriate expansion ratio (about 60 kg/m$^3$). In order to meet this demand, the ratio of hard segments in a foamed urethane is increased.

A hard segment has a high melting point or a high glass transition temperature. For this reason, a hard segment contributes to high modulus and high strength. A hard segment is a portion which develops the strength or the like of a foamed urethane.

On the other hand, a soft segment has a glass transition temperature lower than room temperature (for example, 25° C.). For this reason, a soft segment contributes to high elongation and elastic recovery. The soft segment is a portion that develops the flexibility of a foamed urethane.

Here, a conventional foamed urethane is considered to have a large proportion of hard segments (for example, in a form of a large aggregate structure in which urea bonds are concentrated) in an air bubble resin (a portion forming a skeleton and a membrane) of the foamed urethane.

When a conventional foamed urethane is subjected to $H^1$ pulse NMR measurement in vacuum at 25±1° C., the spin-spin relaxation time (T2) of a hard segment obtained by $H^1$ pulse NMR (nuclear magnetic resonance) measurement in vacuum at 25±1° C. is less than 30 μsec as a whole. A conventional foamed urethane is therefore considered to form as a whole a large aggregate structure in which urea bonds are densely formed (for example, a urea bond aggregate structure having a diameter of 10 nm or more). As the volume abundance ratio of the hard segment increases, a foamed urethane is considered to have a structure having a large abundance ratio of urea bond aggregate structures. In other words, when the spin-spin relaxation time (T2) of the hard segment is less than 30 μsec and the volume abundance ratio of the hard segment is large, it is presumed that a structure having a large number of large aggregate structures in which urea bonds are densely formed is formed.

In the disclosure, the measured temperature of 25±1° C. means that the error is allowed up to the range of ±1° C. with reference to 25° C. The meaning of the term "±" represents a similar meaning (in other words, an error up to the numerical value described on the right is allowed with reference to the numerical value described on the left side of ±).

The hardness of a seat cushion material using a conventional foamed urethane as a whole is high. This is believed to be due to the large number of large aggregate structures in which urea bonds are densely formed. Therefore, when a seat cushion material using such a foamed urethane is applied as a vehicle seat cushion material, a load is less likely to be dispersed when an occupant is seated. As a result, such a seat cushion material has low soft feel and body pressure dispersibility (fit feeling), and furthermore, bottom tipping feeling and foreign body feeling are likely to emerge. In such a seat cushion material, vibrations are difficult to disperse and the vibration absorbing property is low. Therefore, the seat cushion material using a conventional foamed urethane has been inferior in riding comfort.

Here, for example, a cushion material disclosed in Japanese Patent No. S60-219018, JP-A No. H06-106627, and JP-B No. H04-034496 is intended to improve riding comfort by using different raw materials to make different hardness cushion materials having different hardness portions. However, the different hardness cushion materials disclosed in these documents do not fully satisfy demanded riding comfort when applied as a vehicle seat cushion material and have room for further improvement. Since the different hardness cushion materials disclosed in these documents are manufactured using different raw materials, they are disadvantageous in terms of equipment and cost.

On the other hand, the seat cushion material according to the second aspect has a specific foamed urethane. The foamed urethane includes a first region and a second region adjacent to the first region. Each region has the characteristics described above in $H^1$ solid-state pulse NMR measurement in vacuum at 25±1° C.

Since the seat cushion material according to the second aspect has the characteristics described above, the viscosity is considered to be dominant as a whole as compared with a conventional seat cushion material. Since the first region has the characteristics described above, it is considered that an aggregate structure in which urea bonds are densely formed is difficult to form and urea bonds are independently present. Therefore, it is considered that the viscosity is dominant in the first region. Since the second region has the characteristics described above, an aggregate structure in which urea bonds are densely formed is more likely to be formed than in the first region. On the other hand, urea bond aggregates are each considered to be small. Therefore, it is considered that elasticity is dominant in the second region than in the first region.

The first region of the foamed urethane is a region arranged on the side of the seating surface (the side close to an occupant) on which the occupant is seated. The second region of the foamed urethane is a region arranged on the side opposite to the side of the seating surface (the side distant from the occupant).

Therefore, due to the characteristics of the first region described above, the foamed urethane is pushed out by a load when an occupant is seated, and a pressure is dispersed. In the second region, due to the characteristics described above, a pressure acts to maintain the attitude of a seated occupant. Therefore, the seat cushion material according to the second aspect is excellent in soft touch, body pressure dispersibility, vibration absorbing property, and bottom tipping feeling and foreign body feeling are suppressed. As a result, it is considered that an occupant seated on the seat cushion material according to the second aspect feels that the cushion material is excellent in riding comfort.

From the above, it can be inferred that the seat cushion material according to the second aspect is excellent in riding comfort.

Here, when a central portion of the foamed urethane containing the first region and the second region is cut in the thickness direction, on this cut surface, the ratio of the thickness of the first region and the second region of the foamed urethane is preferably, for example, the range shown below.

The ratio (h1/h0) of the thickness (h1) of the first region to the total thickness (h0) of the foamed urethane: from 5% to 35%

The ratio (h2/h0) of the thickness (h2) of the second region to the total thickness (h0) of the foamed urethane: from 65% to 95%

In the second aspect, the first region and the second region are separated for convenience as follows.

A measurement sample is collected in the thickness direction from a central portion of a foamed urethane containing the first region and the second region. The spin-spin relaxation time (T2) of the collected test piece is measured according to the $H^1$ solid-state pulse NMR measurement shown below. Then, among the measurement samples collected in the thickness direction, a region whose spin-spin relaxation time (T2) is 30 μsec or more is set as the first region. The region whose spin-spin relaxation time (T2) is less than 30 μsec is set as the second region.

Relationships of the spin-spin relaxation time (T2) of the hard segment at each position in the thickness direction of the foamed urethane will be described with reference to FIG. 6. FIG. 6 is represented as a biaxial graph. FIG. 6 is a graph showing a relationship between the thickness of the foamed urethane from the surface and the spin-spin relaxation time (T2) and a relationship between the thickness of the foamed urethane from the surface and the Asker F hardness in Examples B2 and B4 described below. The first vertical axis (left vertical axis) shown in FIG. 6 is the spin-spin relaxation time (T2) of the hard segment, and the horizontal axis is the depth in the thickness direction of the foamed urethane (denoted as "thickness from the surface layer"). The second longitudinal axis (vertical axis on the right side) is the Asker F hardness (denoted as "F hardness").

As shown in FIG. 6, the total thickness of the foamed urethane in Examples B2 and B4 described below is 100 mm. The spin-spin relaxation time (T2) and Asker F hardness are measured by the measurement methods described below. However, in the graph shown in FIG. 6, measured values of all test pieces collected by slicing at intervals of 5 mm in the thickness direction are shown.

From the graph shown in FIG. 6, it is possible to find the respective ranges of a region where the spin-spin relaxation time (T2) of the hard segment is 30 μsec or more and a region where the time is less than 30 μsec. In other words, ranges of the first region and the second region are known. As shown in FIG. 6, it can be seen that the first region is in the range of about 10 mm or less for the foamed urethane of Example B2 and the first region is in the range of about 25 mm or less for the foamed urethane of Example B4. Similarly, it can be seen that the second region is in the range of about 10 mm or more for the foamed urethane of Example B2, and the second region is in the range of about 25 mm or more for the foamed urethane of Example B4.

Therefore, it is understood that the thickness (h1) of the first region is in the range of from 5% to 35% with respect to the total thickness (h0), and the thickness (h2) of the second region is in the range of from 65% to 95% with respect to the total thickness (h0).

From FIG. 6, in both Example B2 and Example B4, in the first region, the spin-spin relaxation time (T2) of the hard segment gradually changes from the surface to the thickness direction of the foamed urethane. On the other hand, in the second region, the change in the spin-spin relaxation time (T2) is small in the thickness direction of the foamed urethane.

In the disclosure, the spin-spin relaxation time of the hard segment is not limited to that shown in FIG. 6.

($H^1$ Solid-State Pulse NMR Measurement)

Here, the spin-spin relaxation time (T2) and the volume abundance ratio in the $H^1$ solid-state pulse NMR (Nuclear Magnetic Resonance) measurement in the second aspect will be described.

First, $H^1$ solid-state pulse NMR measurement will be described. In the second aspect, the $H^1$ solid-state pulse NMR measurement is carried out in a vacuum at 25±1° C., with a seat cushion material to be measured being vacuum dried overnight at room temperature and vacuum sealed as a test piece. Specific measurement conditions are similar to the measurement conditions described in the first embodiment, except that the measurement temperature is 251° C.

In the second aspect, a test piece for measuring the first region is collected by slicing every 5 mm from a portion including the outer surface (for example, the surface on the mold bottom side) corresponding to the first region of the seat cushion material. Then, among the collected test pieces, the surface on the outer surface side of a seat cushion material is measured.

In order to measure the second region, a test piece containing a portion of 15 mm from the outer surface corresponding to the second region of the seat cushion material to the first region (for example, a portion of 15 mm when slicing every 5 mm from the upper side of the mold toward the bottom side of the mold) is collected. Then, a position of 15 mm from the outer surface corresponding to the second region of the seat cushion material toward the first region is measured.

In the $H^1$ solid-state pulse NMR measurement, the harder the component is, the shorter the spin-spin relaxation time (T2) is, while the softer component the longer the spin-spin relaxation time (T2), as described in the first aspect.

When a $H^1$ solid-state pulse NMR measurement is performed on a foamed urethane containing a hard segment and a soft segment, as described the first aspect described above, as the formation of a urea bond aggregate structure progresses, the spin-spin relaxation time (T2) becomes shorter, and as the formation of a urea bond aggregate structure is suppressed, the spin-spin relaxation time (T2) becomes longer.

The larger the volume abundance ratio of the hard segment (or the more the urea bond aggregate structures are formed), the shorter the spin-spin relaxation time (T2) is.

From the above, that the spin-spin relaxation time (T2) of the hard segment of the first region and second region is in the above-described range in the $H^1$ solid-state pulse NMR measurement under vacuum at 25±1° C. is considered to mean that there is a small number of hydrogen bonds between urea bonds in the urea bond aggregate structure in the foamed urethane (or there are a small number of large aggregate structures in which urea bonds are densely formed).

In particular, when the spin-spin relaxation time (T2) of the first region is from 30 μsec to 40 μsec, it is considered that there are urea bonds in a state close to monodispersion. When the spin-spin relaxation time (T2) of the second region is from 20 μsec to less than 30 μsec, it is considered that there are small urea bond aggregates.

That the volume abundance ratio of the hard segment of the first region is in the range of from 10% to 40% and the volume abundance ratio of the hard segment of the second region is in the range of from 5% to 40% is considered to be a structure in which the abundance ratio of hydrogen bonds between urea bonds in the urea bond aggregate structure (or the number of aggregate structures in which urea bonds are densely formed) is suppressed to be small.

(Physical Properties)

The foamed urethane of the seat cushion material according to the second aspect is preferably a seat cushion material having an excellent riding comfort, and has the following various physical properties.

—Asker F Hardness—

In a foamed urethane, assuming that the Asker F hardness in the first region is F1 and the Asker F hardness in the second region is F2, the absolute value (|F1−F2|) of the difference between F1 and F2 is preferably from 10 to 50. The absolute value of the difference between F1 and F2 may be from 10 to 45, or may be from 10 to 40.

The Asker F hardness in the first region and the second region is not particularly limited. For example, the Asker F hardness is preferably within the following range.

The Asker F hardness in the first region is preferably from 20 to less than 50. The lower limit of the Asker F hardness in the first region is preferably 25 or more. The upper limit of the Asker F hardness in the first region may be 45 or less, or may be 40 or less.

The Asker F hardness in the second region is preferably from 50 to 70. The upper limit of the Asker F hardness in the second region may be 65 or less, or may be 60 or less.

When the absolute value of the difference in the Asker F hardness in each region and the Asker F hardness in each region are within the above ranges, excellent riding comfort tend to obtained. It is considered that the Asker F hardness in the first region and the second region is attributable to, for example, the size of the urea bond aggregate and the amount of the urea bond aggregate.

The Asker hardness is measured using the ASKER hardness tester F type, and the surface hardness of the seat cushion material to be measured is measured under a temperature condition of 21±+2° C.

The Asker F hardness of a portion in the first region and the second region of the seat cushion material to be measured is measured by setting the Asker hardness tester F type on the surface at the position shown below and reading the value after 20 seconds.

First region: the outer surface corresponding to the first region of the seat cushion material is measured.

Second region: a position of 15 mm from the outer surface corresponding toward the second region of the seat cushion material to the first region (as an example, the surface by slicing every 5 mm) is measured.

Here, FIG. 6 is referred to again. It is understood from FIG. 6 that the foamed polyurethane of Example B2 and Example B4 has smaller Asker hardness as the spin-spin relaxation time (T2) of the hard segment is larger. The Asker F hardness in the first region is lower than the Asker F hardness in the second region. In other words, it can be seen that the Asker F hardness is correlated with the spin-spin relaxation time (T2) of the hard segment. Further, it can be seen that in any of the foamed polyurethanes of Example B2 and Example B4, the absolute value of the difference between the Asker F hardness in the first region (F1: F hardness at the position of 0 mm thickness from the surface layer shown in FIG. 6) and the Asker F hardness in the second region (F2: F hardness at a position near the thickness of 85 mm from the surface layer shown in FIG. 6)) is in the range of 10 to 50. In the second aspect, the Asker F hardness is not limited to that shown in FIG. 6.

—Hysteresis Loss—

The hysteresis loss of the foamed urethane is an indicator of the body pressure dispersibility of a seat cushion material, bottom tipping feeling, and foreign body feeling. The range of the hysteresis loss is not particularly limited, and it is preferably, for example, from 8% to 20%.

The hysteresis loss is a value obtained by a compression defrection test. The hysteresis loss is calculated from the compression-defrection measurement curve by a constant load compression method according to JIS K6400-2 (2012).

Specifically, a test piece of 380 mm in length×380 mm in width (product thickness in thickness) is cut out from the seat cushion material to be measured to obtain a measurement sample. Next, the thickness at the time of loading at 10 mm/min in the vertical direction by a pressurizing plate (iron scraping plate: see FIGS. 4A and 4B) at room temperature (21±2° C.; room temperature in the following measurement is 21±2° C.) and pressurizing with 4.9 N is defined as the initial thickness. After determining the initial thickness, the test piece is compressed to a maximum load of 980 N at a compression rate of 150 mm/min, and the test piece is deformed. Next, the pressurizing plate is returned to the initial thickness at the same speed, left for 1 minute, which constitutes a preliminary compression. After 1 minute, the pressurizing plate is again moved to compress the test piece at a maximum load of 980 N at a compression rate of 150 mm/min, and the test piece is deformed. After that, the pressurizing plate is returned to the initial thickness at the same speed to graphically show the measurement history (see FIG. 5).

Figure 5:
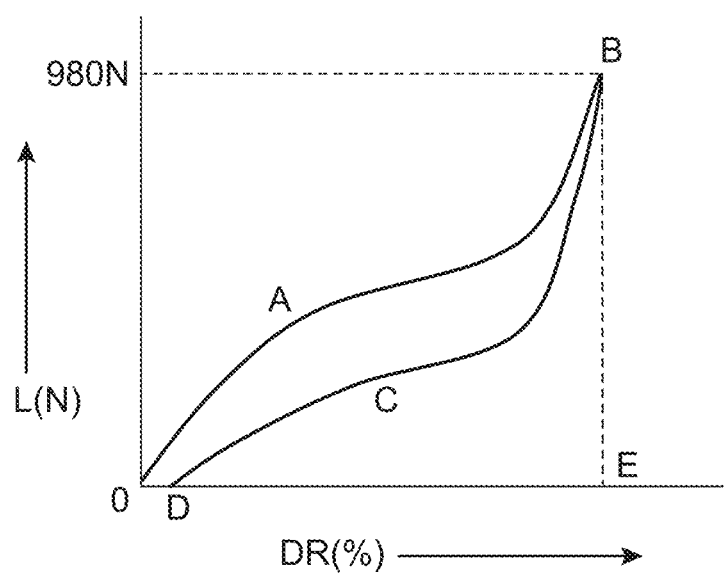
FIG. 5 is a graph schematically showing an example of a compression-defrection curve.

FIG. 5 is a graph schematically showing an example of a compression-defrection curve. The hysteresis loss is expressed as a percentage (percent (%)) of the area 0ABCD of a region surrounded by origin 0-curve A-point B-curve C-point D with respect to the area 0ABE0 of a region surrounded by origin 0-curve A-point B-point E-origin 0 in the graph shown in FIG. 5, and is obtained by the following Formula.

$$\text{hysteresis loss } Af = ((\text{area } 0ABCD/\text{area } 0ABE0) \times 100) \quad \text{(Formula)}$$

In FIG. 5, the horizontal axis DR (%) is the deflection rate (%) and the vertical axis L (N) is the load.

—Elastic Repulsion—

The elastic repulsion coefficient of a foamed urethane is an index of the fit feeling of a seat cushion material. Elastic repulsion is not particularly limited, and is preferably, for example, from 35% to 50%.

The elastic repulsion coefficient is measured in accordance with JIS K6400-3 (2011). In particular, a test piece of 50 mm×100 mm×100 mm or more is cut out from a target seat cushion material, a steel ball with a diameter of 16 mm and a mass of 16 g is dropped from the height of 500 mm from the upper surface of the test piece at room temperature, and the highest rebounded height is expressed by the percentage (%) of the falling height (500 mm).

—Logarithmic Decrement—

The logarithmic decrement of a foamed urethane is an index of the vibration absorbing property of a seat cushion material. Logarithmic decrement is essentially a parameter for evaluating the attenuation of a material, and the larger the value is, the higher the damping performance the material has.

The logarithmic decrement is measured in accordance with JIS K 6394 (2007). Specifically, the logarithmic decrement is obtained by dividing a logarithmic decrement ($\Lambda$) by $2\pi$ in the response side damped oscillation waveform obtained by a vibration test at room temperature. The logarithmic decrement ($\Lambda$) is determined by taking the natural logarithm of the ratio (An/An+1) of the heights An of adjacent amplitudes.

In general, the value of decrement differs depending on a natural vibration mode called a first eigen mode, a second eigen mode, or the like in order from the smaller frequency.

Therefore, the logarithmic decrement is measured as follows for a target seat cushion material. In the seat cushion material according to the second aspect, the decrement average value is calculated from the average value of the decrements of a plurality of eigenmodes appearing in a frequency range from 0 Hz to 500 Hz. and is used as a representative value indicating damping performance. The method of determining the decrement is as follows. First, a transfer function (the ratio of an input excitation force and a response which is an output) is obtained from the vibration test result. Then, an obtained function value is arithmetically processed by a curve fitting method to calculate the decrement for each mode. By this arithmetic processing, the natural frequency for each mode can also be calculated.

Regarding the hysteresis loss, elastic repulsion coefficient, and logarithmic decrement, the measurement positions of the seat cushion material to be measured are as follows.

The measurement of the first region includes a first region of the test piece (400 mm×400 mm×100 mm thickness), and a measurement sample is cut out in such a manner that the thickness of a test piece is the thickness center (the outer surface of the first region 50 mm) from the outer surface of the first region to the second region. Measurement of the hysteresis loss, elastic repulsion coefficient, and logarithmic decrement is performed by applying a load (performing each test) to the outer surface of the first region.

In the measurement of the second region, a measurement sample is cut out in such a manner that the total thickness with respect to the thickness center of the test piece (50 mm from the outer surface of the first region) is 50 mm in the thickness direction, 25 mm toward the outer surface of the first region, and 25 mm toward the outer surface of the second region. The measurement sample is cut out in such a manner to be in a range corresponding to the second region. Then, the hysteresis loss, elastic repulsion coefficient, and logarithmic decrement are measured by applying a load (performing each test) to the cut surface on the first region side of the measurement sample.

(Hygrothermal Compression Permanent Set)

Next, hygrothermal compression permanent set will be described.

In the seat cushion material according to the second aspect, the hygrothermal compression permanent set is a measurement of compression permanent set after 50% compression for 22 hours under conditions of a temperature of 50° C.±2° C. and a relative humidity of 95%.

Specifically, a seat cushion material to be measured is cut into a test piece of 40 mm±1 mm in thickness. The thickness (t0) of the test piece is measured, the test piece is compressed and fixed to 50% of the thickness thereof, and left for 22 hours in a high humidity thermostatic bath at 50° C.±2° C. and 95% relative humidity. Then, the test piece in a fixed state is removed, and the thickness (t1) of the test piece after 30 minutes is measured. Then, the value obtained by the following Formula is taken as a value of hygrothermal compression permanent set.

$$\text{hygrothermal compression permanent set } (\%) = \{(t0-t1)/t0\} \times 100 \quad \text{(Formula)}$$

The hygrothermal compression permanent set (compression permanent set after 50% compression for 22 hours under conditions of a temperature of 50° C.±2° C. and a relative humidity of 95%) reflects a practical use environment of, for example, a vehicle seat, and is known as a reliability test over time under a condition of a hygrothermal load simultaneously with a compressive load. By measuring a final thickness change (permanent set) of a seat cushion material, changes in vibration absorbing property, impact resilience, bottom tipping feeling, or the like can be predicted from a hygrothermal compression permanent set. In other words, a hygrothermal compression permanent set is an index for knowing the influence over time on riding comfort when a seat cushion material is applied to a vehicle seat.

As an index representing the riding comfort of a seat cushion material over time, it is desirable that the hygrothermal compression permanent set is small.

In a foamed urethane of the seat cushion material according to the second aspect, the compression permanent set after 50% compression for 22 hours under conditions of a temperature of 50° C.±2° C. and a relative humidity of 95% is preferably 1% or less. The compression permanent set is preferably 0.8% or less, and more preferably 0.5% or less.

That the hygrothermal compression permanent set is 1% or less means that the compression set over time under hygrothermal conditions is suppressed low. Therefore, this means that excellent riding comfort can be obtained when the seat cushion material according to the second aspect is applied to, for example, a vehicle seat cushion material.

The smaller the hygrothermal compression permanent set is, the better the riding comfort over time, and therefore, the lower limit value of the hygrothermal compression permanent set is preferably 0%, and the lower limit value is not particularly limited.

A foamed urethane which is a material of the seat cushion material according to the second aspect will be described below. The foamed urethane is an open-cell urethane foam.

The seat cushion material according to the second aspect includes a foamed urethane formed using an isocyanate component of a diphenylmethane diisocyanate compound. Specifically, the foamed urethane is a reaction cured product obtained by reacting and curing a mixed raw material of an isocyanate component of a diphenylmethane diisocyanate compound, a polyol component, a catalyst, and a foaming agent.

Particularly from the viewpoint of attaining excellent riding comfort of a seat cushion material, a foamed urethane is preferably a reaction cured product formed by using polyisocyanate component prepared by reacting a mixture of monomeric diphenylmethane diisocyanate and polymeric diphenylmethane diisocyanate with part of polyol in advance.

Hereinafter, each component for forming a foamed urethane will be described in the second aspect.

(Isocyanate Component)

The isocyanate components exemplified for the seat cushion material according to the second aspect are the same as the isocyanate components exemplified for the cushion material according to the above-described first aspect.

From the viewpoint of attaining excellent riding comfort of a seat cushion material, an MDI compound preferably contains an isocyanate terminal-modified polyisocyanate obtained by reacting a mixture of a monomeric MDI and a polymeric MDI with a part of a polyol component (that is to say, a prepolymer obtained by reacting a mixture of a monomeric MDI and a polymeric MDI with a part of a polyol component) among the above. An isocyanate terminal-modified polyisocyanate obtained by reacting a mixture of a monomeric MDI and a polymeric MDI with a part of a polyol component is more preferable. When such an isocyanate terminal-modified polyisocyanate is used, formation of a urea bond aggregate structure is easily suppressed.

In an isocyanate terminal-modified polyisocyanate obtained by reacting a mixture of a monomeric MDI and a polymeric MDI with a part of a polyol component, the mixing ratio (mass ratio) of a monomeric MDI and a polymeric MDI is preferably in the range of from 30/70 to 90/10 as the ratio of the mass of the monomeric MDI to the mass of the polymeric MDI (monomeric MDI/polymeric MDI). The mixing ratio is more preferably in the range of from 32/68 to 80/20. When the MDI mixing ratio (mass ratio) of the monomeric MDI and the polymeric MDI is within the range of from 30/70 to 90/10, formation of a foam having characteristics deviating from a seat cushion material is suppressed. In addition, deterioration of moldability is suppressed.

The NCO content (% by mass) of an isocyanate terminal-modified polyisocyanate obtained by reacting a mixture of a monomeric MDI and a polymeric MDI with a part of a polyol component is preferably finally adjusted to be from 10 to 30.

(Polyol Component)

Detailed definitions, preferred definitions, properties, examples or the like of the polyol component in the seat cushion material according to the second aspect is the same as detailed definitions, preferred definitions, properties, examples and the like of the polyol component in the cushion material according to the above-described first aspect.

(Catalyst)

Details of definitions, preferred definitions, properties, examples, and the like of the catalyst in the seat cushion material according to the second aspect are the same as details of definitions, preferred definitions, properties, examples, and the like of the catalyst in the cushion material according to the above-described first aspect. The addition amount of the catalyst used in the seat cushion material according to the second aspect is also the same as the addition amount of the catalyst exemplified for the cushion material according to the first aspect.

(Foaming Agent)

Details of definitions, preferred definitions, properties, examples, and the like of the foaming agent in the seat cushion material according to the second aspect are the same as details of definitions, preferred definitions, properties, examples, and the like of the foaming agent in the cushion material according to the above-described first aspect.

(Other Components)

Details of definitions, preferred definitions, properties, examples, and the like of the other components in the seat cushion material according to the second aspect are the same as details of definitions, preferred definitions, properties, examples, and the like of the other components in the cushion material according to the above-described first aspect.

(Molar Ratio of Isocyanate Group to Active Hydrogen Group in Mixed Raw Material)

In the mixed raw material for obtaining a foamed urethane, the isocyanate index (NCO INDEX) represented by the molar ratio (NCO group/active hydrogen group) of isocyanate groups and active hydrogen groups is not particularly limited. In view of obtaining excellent riding comfort, the isocyanate index is preferably, for example, from 90 to 120. The lower limit of the isocyanate index may be 95 or more, or may be 100 or more. The upper limit of the isocyanate index may be 115 or less, or may be 110 or less. Here, the isocyanate index is obtained as a percentage of the value obtained by dividing the number of moles of isocyanate groups in an isocyanate component by the total number of moles of active hydrogen groups capable of reacting with isocyanate groups (hydroxyl group of the polyol component, water as a foaming agent, or the like).

In the disclosure, the isocyanate index represents a value when reacting and curing a mixed raw material for obtaining a foamed urethane containing an isocyanate component and a component capable of reacting with an isocyanate component. Therefore, the index does not represent an isocyanate index when obtaining an isocyanate component of an isocyanate terminal-modified polyisocyanate.

Next, a method of producing a foamed urethane for use in a seat cushion material according to a second aspect will be described.

(Method of Producing Foamed Urethane)

In the seat cushion material according to the second aspect, the method of producing a foamed urethane is not particularly limited, and a known method of a slabstock method and a molding method of molding in a mold can be applied.

An example of a preferable production method of a foamed urethane is a method including a first step of preparing an isocyanate component of a diphenylmethane diisocyanate compound and a second step of molding a raw material obtained by mixing the isocyanate component, a polyol component, and a foaming agent.

As the first step, for example, it is preferable to prepare a polyisocyanate component prepared by mixing a mixture of a monomeric MDI and a polymeric MDI with a part of a polyol in advance (that is to say, an isocyanate terminal-modified polyisocyanate obtained by reacting a mixture of a monomeric MDI and a polymeric MDI with a part of a polyol component). The mixture ratio of the monomeric MDI and the polymeric MDI is preferably from 30/70 to 90/10 (mass ratio) as the mixing ratio of monomeric MDI/polymeric MDI. It is preferable to carry out adjustment such that the NCO content (% by mass) of the isocyanate group (NCO group) finally becomes from 10 to 30. The isocyanate component of the diphenylmethane diisocyanate compound is not limited to The isocyanate terminal-modified polyisocyanate obtained by reacting a mixture of a monomeric MDI and a polymeric MDI with a part of a polyol component is not limited, and an isocyanate component similar to the above-described isocyanate component may be used.

The second step is a step of molding a mixed raw material containing an isocyanate component, a polyol component, and a foaming agent prepared in the first step.

Hereinafter, a case where an isocyanate terminal-modified polyisocyanate obtained by reacting a mixture of a monomeric MDI and a polymeric MDI with a part of a polyol component is prepared as the isocyanate component of the diphenylmethane diisocyanate compound in the first step will be described. As a second step, a case of molding by a molding method for molding in a mold will be described.

In the second step, the mixed raw material is poured into a mold and foamed at a predetermined temperature in a molding mold, whereby a reaction cured product of a foamed urethane can be obtained.

Generally, during the period from injection of a raw material into a mold until immediately before a reaction starts, the larger the molecular weight, the easier a molecule is to move in a direction toward the bottom of the mold, and the smaller the molecular weight and the more active the molecular movement, the more the reaction tends to proceed while moving to the upper side of the mold away from the mold bottom.

When the mixed raw material using the isocyanate terminal-modified polyisocyanate is injected into a mold, it is considered that a region having a high abundance ratio of isocyanate terminal-modified polyisocyanates mainly containing a polymeric MDI is formed in a region on the mold bottom side. On the other hand, in the region on the upper surface side of the mold, it is considered that a region having a high abundance ratio of isocyanate terminal-modified polyisocyanate mainly containing a monomeric MDI is formed.

Isocyanate terminal-modified polyisocyanates mainly containing a polymeric MDI are poor in reactivity because of their slow molecular motion and short movement distance. As a result, small urea bond aggregates are difficult to form in a region on the mold bottom side, and urea bonds are likely to be present independently.

On the other hand isocyanate terminal-modified polyisocyanates mainly containing a monomeric MDI are highly reactive because of their dynamic molecular motion and long movement distance. As a result, in the region on the upper surface side of the mold, smaller urea bond aggregates tend to be formed more easily than a region on the mold bottom side.

The temperature of the molding mold when foaming is preferably in the range of from 30° C. to 50° C. (the lower limit is preferably 35° C. or more, and the upper limit is preferably 45° C. or less). When the temperature of the mold is within this range, the molecular motion is slow in a region on the bottom side of the mold, and the reactivity with water is poor. Therefore, the formation rate of a urea bond is slow. In addition, even when urea bonds are formed, it is difficult to form a urea bond aggregate. Urea bonds tend to be easily monodispersed.

On the other hand, in a region on the upper side of the mold, a reaction proceeds involving an exothermic reaction with water. Therefore, the reactivity becomes more active than a region on the mold bottom side, and a small urea bond aggregate tends to be formed.

As a result, in the reaction cured product of the foamed urethane obtained, in a $H^1$ solid-state pulse NMR measurement at 25±1° C. in a region on the bottom side of the mold, it is easier to control the range of the spin-spin relaxation time (T2) of a hard segment to from 30 μsec to 40 μsec and the volume abundance ratio of a hard segment to from 10% to 40%. In a region on the upper surface side of the mold, in a $H^1$ solid-state pulse NMR measurement at 25±1° C., it becomes easier to control the range of the spin-spin relaxation time (T2) of a hard segment to from 20 μsec to less than 30 μsec and the volume abundance ratio of a hard segment to from 5% to 40%. In other words, a region on the mold bottom side is the first region, and a region on the mold upper surface side adjacent to the first region is the second region.

As described above, according to a preferred production method described above, a foamed urethane having a region exhibiting different properties can be obtained from a single raw material, whereby a seat cushion material excellent in riding comfort is obtained. Furthermore, improvement in terms of cost is expected.

When the temperature of the molding mold during foam molding exceeds 50° C. (for example, 60° C. or more), a skin layer containing a urea bond aggregate structure is likely to be formed on the surface of a foamed urethane in contact with the mold inside the mold. Therefore, the riding comfort tends to decrease. When the temperature is lower than 30° C., it becomes difficult to produce a foamed urethane.

In the second step, the mixed raw material may be prepared in the order that the catalyst and the foaming agent are previously mixed with the polyol component (premix) and then mixed with the isocyanate component prepared in the first step. The isocyanate component prepared in the first step may be mixed with the catalyst, the foaming agent, and the polyol component, respectively.

In the method of producing a foamed urethane, when moisture is present in the production environment of a foamed urethane in the first step and the second step, the isocyanate component of the diphenylmethane diisocyanate compound reacts with moisture, and a urea bond is likely to be formed. Therefore, it is preferable to produce a foamed urethane in a nitrogen purge atmosphere in all steps of the production process. In the nitrogen purge atmosphere, generation of a urea bond aggregate structure is easily suppressed.

(Applications)

Since the seat cushion material according to the second aspect is excellent in riding comfort, it is suitable as a cushion material for a vehicle (a ship, an aircraft, a car, a virtual reality device, or the like). In particular, the seat cushion material is more preferably applied to a car seat cushion material. Examples of the car seat include a car seat such as an automobile seat or a railway seat. Other examples of the car seat include a seat of a car such as a cultivator, a tractor, a power shovel, a hydraulic crane, an excavator, or a bicycle. In particular, such a cushion material is suitably applied to a seat for automobiles. In addition, such a cushion may be applied to a seat cushion material used in facilities such as theaters, or movie theaters.

<Seat>

Next, an embodiment which is an example of a seat to which the seat cushion material according to the second aspect is applied will be described.

The seat according to the second aspect includes: a seat portion for supporting buttocks of a seated occupant; and a backrest portion for supporting the back portion and the waist portion of the seated occupant. At least one of the seat portion and the backrest portion includes the seat cushion material according to the second aspect. In the seat cushion material according to the second aspect, the first region of the foamed urethane is arranged on the seating surface (or the seated occupant side).

Here, the seat cushion material according to the second aspect may be applied to both of the seat portion and the backrest portion, and may be applied to either the seat portion or the backrest portion. The seat cushion material according to the second aspect is preferably applied to at least a seat portion. The seat cushion material according to the second aspect may be applied to a portion of the seat portion.

Hereinafter, an example of a seat according to a second aspect of the disclosure will be described with reference to the drawings.

Figure 2:
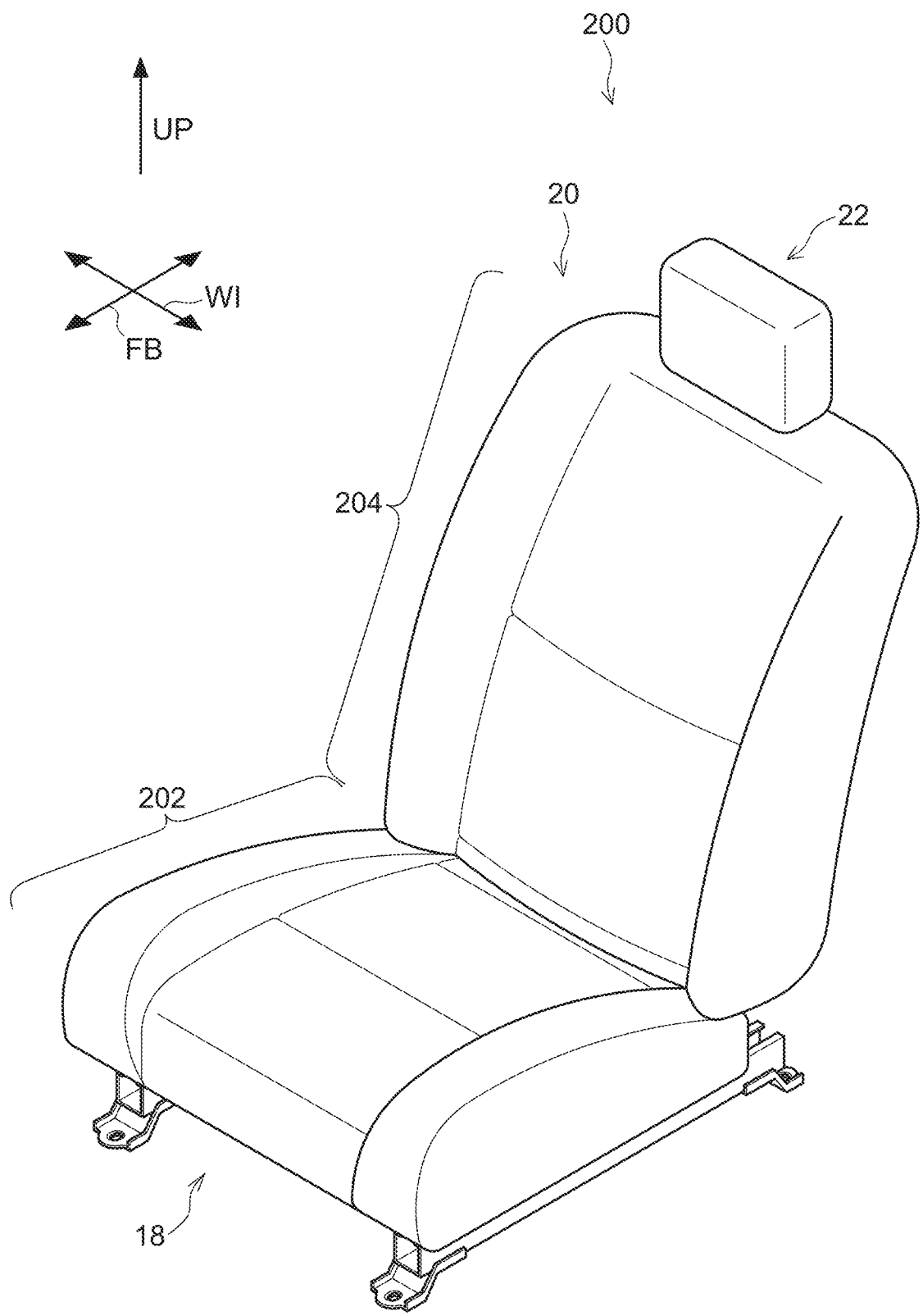
FIG. 2 is a perspective view showing an example of a seat according to the second aspect.

FIG. 2 is a perspective view showing an example of a seat according to the second aspect. The seat 200 shown in FIG. 2 is shown as an example of an automobile seat. As shown in FIG. 2, the seat 200 is a seat used in the front row of a car. The seat 200 includes a seat portion 202 for supporting buttocks of a seated occupant and a backrest portion 204 for supporting the back and waist of the seated occupant. The surface of the seat portion 202 has a cushion skin 18, and the surface of the backrest portion 204 has a back skin 20. The seat 200 (hereinafter, referred to as "seat 200") is provided with a headrest 22 for supporting the head of an occupant.

Figure 3:
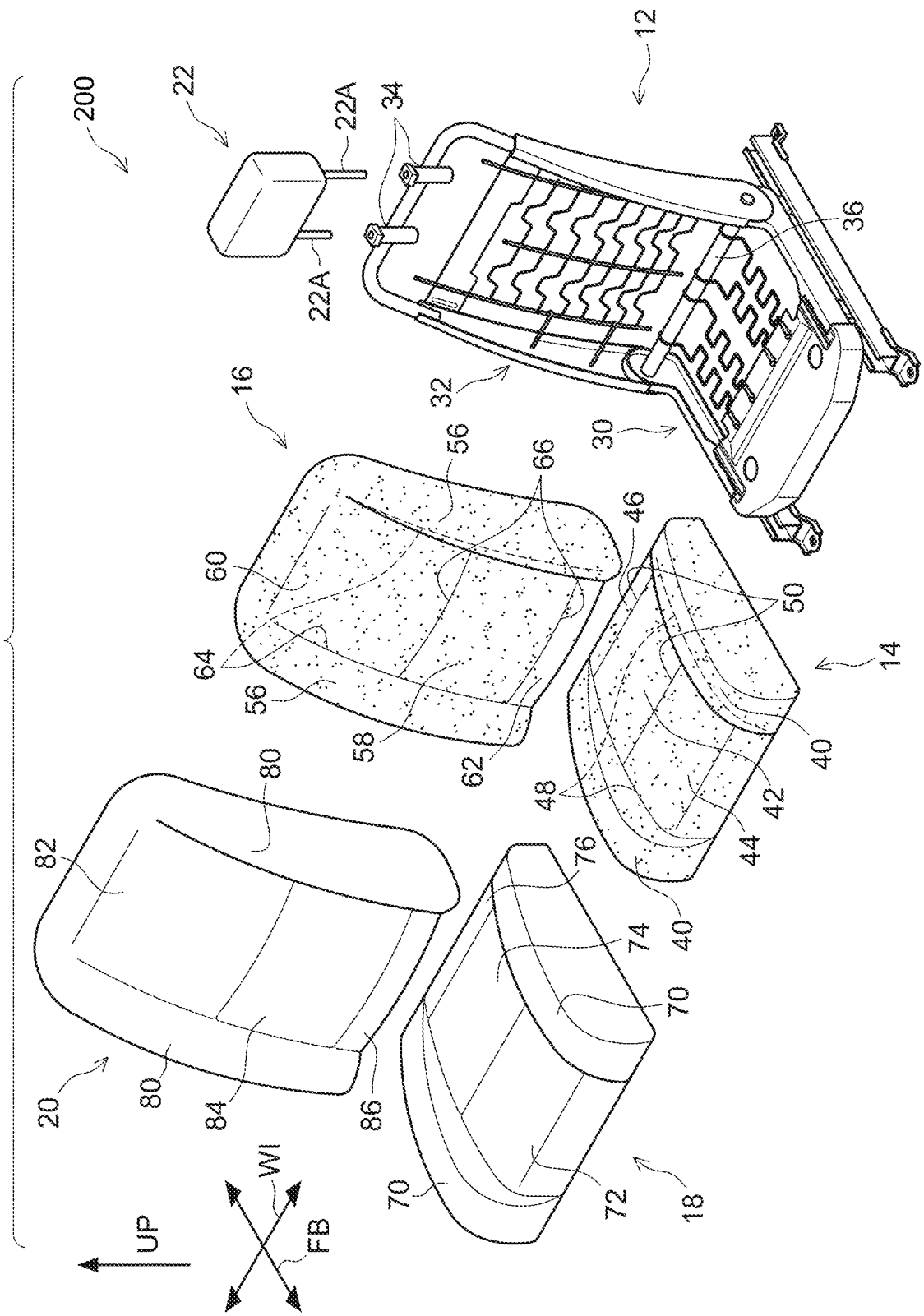
FIG. 3 is an exploded view showing an example of a seat according to the second aspect.

FIG. 3 is an exploded view showing an example of the seat according to the second aspect. FIG. 3 shows an exploded view of the seat 200 shown in FIG. 2. As shown in FIG. 3, the seat 200 includes a frame 12 as a support body, a seat cushion 14 attached to the frame 12, a seat back 16 attached to the frame 12, and a headrest 22 attached to the frame 12. Further, the seat 200 includes the cushion skin 18 as an example of a skin covering the seat cushion 14, and a back skin 20 as an example of a skin covering the seat back 16.

The frame 12 includes a cushion frame 30 for supporting the seat cushion 14, a back frame 32 for supporting the seat back 16, and a pair of head brackets 34 for supporting the head rest 22.

Further, the rear end side in the seat longitudinal direction of the cushion frame 30 and the lower end side in the vertical direction of the back frame 32 are connected via a shaft member 36 extending in the seat width direction. Then, with the shaft member 36 as a rotation center, the back frame 32 is configured to swing.

The head bracket 34 is attached to the upper end side of the back frame 32, and two head brackets 34 are provided at intervals in the seat width direction. The head bracket 34 has a tubular shape extending in the vertical direction, and a pair of support rods 22A provided in the headrest 22 are inserted. As a result, the headrest 22 is supported by the frame 12 (the head bracket 34).

The seat cushion 14 is formed of a seat cushion material molded from a foamed urethane. A seat cushion material according to the second aspect is applied to the seat cushion 14. The first region of the foamed urethane of the seat cushion material according to the second aspect is arranged in such a manner to be on the side of a seated occupant. The seat cushion 14 includes a pair of side support portions 40 for suppressing a seated occupant from sliding in the seat width direction. The side support portion 40 is formed at both end portions in the seat width direction of the seat cushion 14, extends in the seat longitudinal direction, and protrudes upward as compared with other portions.

The seat cushion 14 includes a main portion 42 arranged between the pair of side support portions 40, a main front portion 44 arranged in front of the main portion 42 in the seat longitudinal direction, and a main rear portion 46 arranged rearward in the seat longitudinal direction with respect to the main portion 42. The main portion 42 supports buttocks of a seated occupant, and the main front portion 44 supports a thigh portion of a seated occupant.

A groove portion 48 extending in the seat longitudinal direction is formed between the main front portion 44, the main portion 42, and the main rear portion 46, and the pair of side support portions 40, and inside the groove 48, a wire (not illustrated) used for fixing the cushion skin 18 is arranged.

Furthermore, a groove portion 50 extending in the seat width direction is formed between the main front portion 44 and the main portion 42 and between the main portion 42 and the main rear portion 46. Inside the groove portion 50, a wire (not shown) used for fixing the cushion skin 18 is arranged.

The seat back 16 is formed of a seat cushion material molded from a foamed urethane. The seat cushion material according to the second aspect is applied to the seat back 16, and the seat back 16 is arranged in such a manner that the first region is on the side of an occupant. The seat back 16 includes a pair of side support portions 56 for suppressing the upper body of a seated occupant from sliding in the seat width direction. The side support portion 56 is formed at both end portions of the seat back 16 in the seat width direction, extends vertically, and protrudes forward as compared with other portions.

Further, the seat back 16 includes a main portion 58 arranged between the pair of side support portions 56 and a main upper portion 60 arranged above the main portion 58, and a main lower portion 62 arranged below the main portion 58. The main portion 58 supports the waist portion of a seated occupant. The main upper part 60 supports the back portion of a seated occupant.

Groove portions 64 extending vertically are formed between the main upper portion 60, the main portion 58, and the main lower portion 62 and the pair of side support portions 56. A wire (not shown) used for fixing the back skin 20 is arranged inside the groove portion 64.

Furthermore, a groove portion 66 extending in the sheet width direction is formed between the main upper portion 60 and the main portion 58 and between the main portion 58 and the main lower portion 62. Inside the groove 66, a wire (not shown) used for fixing the back skin 20 is arranged.

As shown in FIG. 3, the cushion skin 18 includes a pair of side skin members 70, a front skin member 72, a main skin member 74, and a rear skin member 76. The side skin members 70 are a pair of skin members covering the side support portions 40. The front skin member 72 is a skin member covering the main front portion 44. The main skin member 74 is a skin member covering the main portion 42. The rear skin member 76 is a skin member covering the main rear portion 46.

As shown in FIG. 3, the back skin 20 includes a pair of side skin members 80, an upper skin member 82, a main skin member 84, and a lower skin member 86. The pair of side skin members 80 covering the side support portions 56 are a pair of skin members covering the side support portions 56. The upper skin member 82 is a skin member covering the main upper portion 60. The main skin member 84 is a skin member covering the main portion 58. The lower skin member 86 is a skin member covering the main lower portion 62. The skin member used for the cushion skin 18 and the back skin 20 is not particularly limited, and a material suitable for a purpose may be used.

With respect to the cushion skin 18 and the back skin 20, the respective skin members are connected by being sewed or the like with the surfaces thereof being joined together at the end sides thereof.

Although the seat according to the second aspect has been described above with reference to FIGS. 2 and 3, the seat according to the second aspect may be applied not only to a seat used in the front row of a car but also to a seat used in the second row or the third row of a car.

Although the cushion material according to the first aspect and the seat cushion material and the seat according to the second aspect have been described in detail above, the cushion material, the seat cushion material, and the seat according to the disclosure are not limited thereto. It will be apparent to those skilled in the art that a variety of changes or modifications can be conceived within the scope of the idea described in the claims, and it should be understood that they also naturally belong to the technical scope of the disclosure.

EXAMPLES

Examples will be described below, but the cushion material according to the first embodiment and the seat cushion material according to the second aspect are not limited to these examples in any manner. In the following description, "parts" and "%" are all based on mass unless otherwise specified.

Examples A1 to A3 and Comparative Examples A1 to A5

First, Examples relating to the cushion material according to the first aspect will be described.

The raw materials shown in Table 1 were blended at the ratio shown in Table 1 in such a manner that the molar ratio (NCO INDEX) of (NCO group/active hydrogen group) was (Evaluation)
—Pulse NMR Measurement—
The foamed urethane obtained in each Example was vacuum dried overnight at room temperature and vacuum sealed to give a test piece. These test pieces were measured under vacuum at 24° C. according to the method described in the first aspect, and the spin-spin relaxation time (T2) of the hard segment and the volume abundance ratio of the hard segment were determined. T2 in Table 1 represents the spin-spin relaxation time (T2).
—Density—
The density of foamed urethane obtained in each Example was measured in accordance with JIS K 7222 (2005).
(Evaluation)
—Compression Permanent Set—
Regarding the compression permanent set of the foamed urethane obtained in each Example, the hygrothermal compression permanent set was measured by measuring the compression set after 50% compression for 22 hours under conditions of a temperature of 50° C. and a relative humidity of 95%, and compression permanent set was calculated according to the method described in the first aspect.

TABLE 1

|  |  | Example A1 | Example A2 | Example A3 | Comparative Example A1 | Comparative Example A2 | Comparative Example A3 | Comparative Example A4 | Comparative Example A5 |
| --- | --- | --- | --- | --- | --- | --- | --- | --- | --- |
| Blend (parts by mass) | PPG (A) | 70 | 70 | 70 | 100 | 70 | 100 | 100 | 70 |
|  | Catalyst (a) | 0.41 | 0.41 | 0.41 | 0.41 | 0.41 | 0.41 | 0.41 | 0.41 |
|  | Catalyst (b) | 0.09 | 0.09 | 0.09 | 0.09 | 0.09 | 0.09 | 0.09 | 0.09 |
|  | Foaming agent ($H_2O$) | 3.2 | 3.2 | 3.2 | 3.2 | 3.2 | 3.2 | 3.2 | 3.2 |
|  | MDI (E) | — | — | — | — | — | — | — | 82.6 |
|  | MDI (B) | 82.6 | 82.6 | 82.6 | — | 82.6 | — | — | — |
|  | MDI (C) | — | — | — | 7.8 | — | 52.6 | 65.8 | — |
|  | TDI (D) | — | — | — | 31.2 | — | — | — | — |
|  | NCO INDEX | 100 | 100 | 100 | 100 | 100 | 100 | 125 | 100 |
| Foaming condition | Mold temperature (° C.) | 30 | 40 | 50 | 50 | 60 | 40 | 40 | 40 |
| Pulse NMR | T2 (µsec) of hard segment | 22.9 | 25.8 | 20.3 | 14.7 | 18.2 | 16.5 | 15.6 | 14.3 |
|  | Volume abundance ratio (%) of hard segment | 19.7 | 22.4 | 18.6 | 37.5 | 35.9 | 25.2 | 33.5 | 38.7 |
|  | Density (kg/m³) | 59.8 | 60.1 | 60.5 | 60.3 | 61.5 | 62.4 | 62.3 | 60.1 |
| Compression permanent set (%) 50° C., 95% RH, 22 hr |  | 0.2 | 0.1 | 0.1 | 11.3 | 7.3 | 5.1 | 8.1 | 12.5 | the value shown in Table 1 to prepare a mixed raw material. Thereafter, the mixed raw material was poured into a mold and molded at the mold temperature shown in Table 1 to obtain a reaction cured product of a foamed urethane. In a preparation step of each raw material, a treatment was carried out in a nitrogen purge atmosphere.

The materials shown in Table 1 are as shown below.

PPG (A): Polyether polyol having a trifunctional number of active hydrogen groups (OH groups) and having a weight average molecular weight of 6,000.

Catalyst (a): Triethylenediamine.

Catalyst (b): Bis(dimethylaminoethyl)ether.

MDI (E): Modified MDI isocyanate of monomeric MDI alone and part of PPG (A).

MDI (B): Modified MDI isocyanate in which a monomeric MDI and a polymeric MDI were reacted with a part of PPG (A) in advance. The mixing ratio of the monomeric MDI and the polymeric MDI was 8/2 (monomeric MDI/polymeric MDI: mass ratio).

MDI (C): MDI polyisocyanate blended with a monomeric MDI and a polymeric MDI in advance at a mixing ratio of 6/4 (monomeric MDI/polymeric MDI: mass ratio).

TDI (D): Tolylene diisocyanate (TDI)

The spin-spin relaxation time (T2) of the hard segment by $H^1$ pulse NMR measurement under vacuum of the foamed urethane obtained in Comparative Examples A1 to A5 is less than 20 µsec. The volume abundance ratio of a hard segment exceeds 25%, which is relatively large. Therefore, the foamed urethanes obtained in Comparative Examples 1 to 5 are predicted to have a dense structure in which a urea bond aggregate structure has developed greatly.

In the foamed urethanes of these Comparative Examples, it is considered that generation of shear mismatch occurring at the hydrogen bond (non-covalent bond) interface between urea bonds in the urea bond aggregate structure is difficult to be suppressed when subjected to a load, since hygrothermal compression permanent set (50° C., 95% RH, 22 hr) exceeds 5%.

Therefore, when the foamed urethanes obtained in Comparative Examples A1 to A5 are used as a vehicle seat cushion material (in particular, car seat cushion material), the comfortability gradually deteriorates with the size of the thickness change (thinning) of a cushion material.

In contrast, in the foamed urethane obtained in Examples A1 to A3, the spin-spin relaxation time (T2) of the hard segment is 20 µsec or more and the volume abundance ratio of the hard segment is 40% or less by $H^1$ pulse NMR measurement under vacuum at 24° C. Therefore, it is predicted that the foamed urethanes obtained in Examples A1 to A3 have a structure in which hydrogen bonds (non-covalent bonds) between urea bonds are suppressed to a small amount.

Since the foamed urethanes of these Examples have a hygrothermal compression permanent set (50° C., 95% RH, 22 hr) of 1% or less, it is considered that generation of shear permanent set of hydrogen bond between urea bonds is suppressed when receiving a load.

For this reason, when the foamed urethane obtained in Examples A1 to A3 are used as a vehicle seat cushion material (in particular, car seat cushion material), the thickness change (thinning) of the cushion material is small and the durability over time is high. As a result, the cushion material to which the foamed urethane obtained in Examples A1 to A3 is applied maintains comfortability and is excellent in riding comfort.

Examples B1 to B5 and Comparative Examples B1 to B5

Next, Examples relating to the seat cushion material according to the second aspect will be described.

The materials shown in Table 2 were blended at the ratio shown in Table 2 in such a manner that the molar ratio (NCO INDEX) of (NCO group/active hydrogen group) was the value shown in Table 2 to prepare a mixed raw material. Thereafter, the mixed raw material was poured into a mold and molded at the mold temperature shown in Table 2 to obtain a reaction cured product of a foamed urethane. In a preparation step of each raw material, a treatment was carried out in a nitrogen purge atmosphere.

The materials shown in Table 2 are as shown below.

PPG (A): Polyether polyol having a trifunctional number of active hydrogen groups (OH groups) and having a weight average molecular weight of 6,000.

Catalyst (a): Triethylenediamine.

Catalyst (b): Bis(dimethylaminoethyl)ether.

MDI (E): Modified MDI isocyanate of monomeric MDI alone and part of PPG (A).

MDI (B): Modified MDI isocyanate in which a monomeric MDI and a polymeric MDI were reacted with a part of PPG (A) in advance. The mixing ratio of the monomeric MDI and the polymeric MDI was 80/20 (monomeric MDI/polymeric MDI: mass ratio).

MDI (F): Modified MDI isocyanate in which a monomeric MDI and a polymeric MDI were reacted with a part of PPG (A) in advance. The mixing ratio of the monomeric MDI and the polymeric MDI was 40/60 (monomeric MDI/polymeric MDI: mass ratio).

MDI (G): Modified MDI isocyanate in which a monomeric MDI and a polymeric MDI were reacted with a part of PPG (A) in advance. The mixing ratio of the monomeric MDI and the polymeric MDI was 35/65 (monomeric MDI/polymeric MDI: mass ratio).

MDI (C): MDI polyisocyanate blended with a monomeric MDI and a polymeric MDI in advance at a mixing ratio of 60/40 (monomeric MDI/polymeric MDI: mass ratio).

TDI (D): Tolylene diisocyanate (TDI)

(Evaluation)

—Pulse NMR Measurement—

The foamed urethane obtained in each Example was vacuum dried overnight at room temperature and vacuum sealed to give a test piece. These test pieces were measured under vacuum at 25±1° C. according to the method described in the second aspect, and the spin-spin relaxation time (T2) of the hard segment and the volume abundance ratio of the hard segment were determined. T2 in Table 2 represents the spin-spin relaxation time (T2).

—Density—

The density of foamed urethane obtained in each Example was measured in accordance with JIS K 7222 (2005).

—Asker F Hardness—

The Asker F hardness of the foamed urethanes obtained in each Example was measured using an ASKER hardness tester F type according to the method described in the second aspect.

—Impact Resilience—

A test piece of 50 mm×100 mm×100 mm was cut out from the foamed urethane obtained in each Example. Then, in accordance with JIS K6400-3 (2011), measurement was performed by the method described in the second aspect.

—Hysteresis Loss—

Figure 4A:
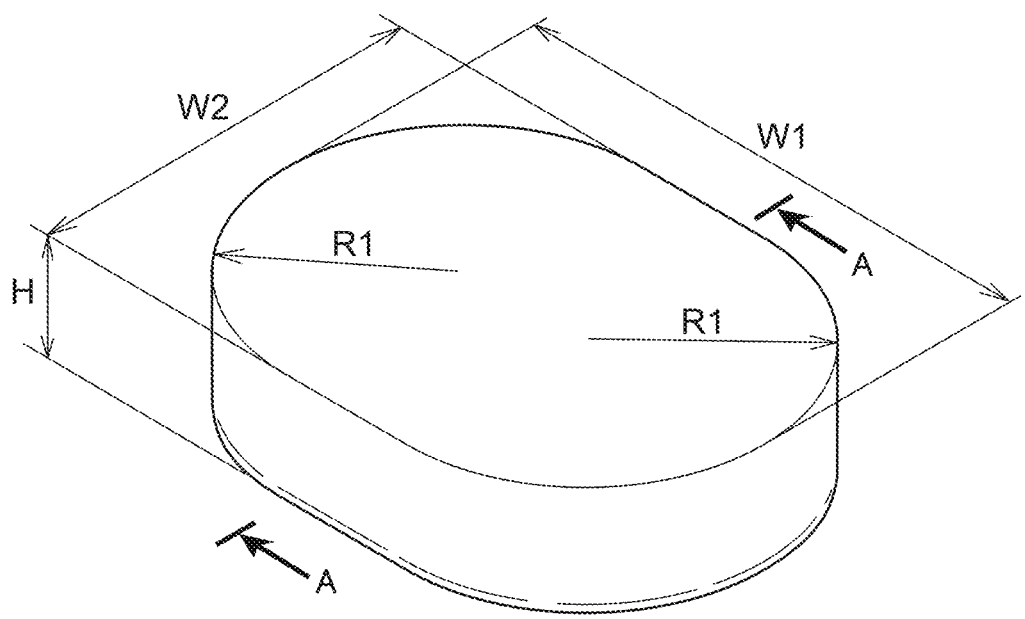
FIG. 4A is a perspective view showing an example of a pressurizing plate for measuring a hysteresis loss.
Figure 4B:
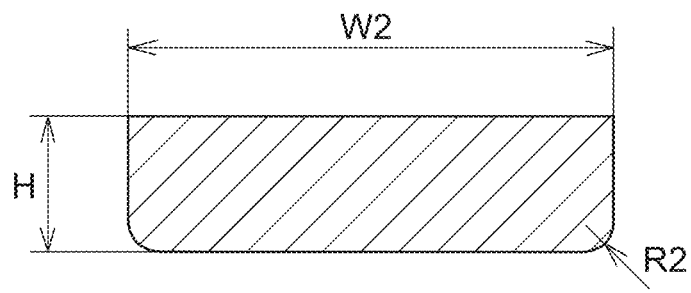
FIG. 4B is a sectional view taken along line AA in FIG. 4A.

The hysteresis loss of the foamed urethane obtained in each Example was measured according to the method described in the second aspect and was calculated in accordance with JIS K6400-2 (2012). Iron scraping plates (dimensions; W1: 300 mm, W2: 250 mm, R1: 125 mm, R2: 30 mm, H: 50 mm) as shown in FIGS. 4A and 4B were used for the measurement.

—Logarithmic Decrement—

The logarithmic decrement of the foamed urethane obtained in each Example was measured in accordance with JIS K6900 (1994) by the method described in the second aspect.

—Compression Permanent Set—

Regarding the compression permanent set of the foamed urethane obtained in each Example, the hygrothermal compression permanent set was measured by measuring the compression set after 50% compression for 22 hours under conditions of a temperature of 50° C.±2° C. and a relative humidity of 95%, and compression permanent set was calculated according to the method described in the second aspect.

TABLE 2

| | | Example B1 | Example B2 | Example B3 | Example B4 | Example B5 | Comparative Example B1 | Comparative Example B2 | Comparative Example B3 | Comparative Example B4 | Comparative Example B5 |
|---|---|---|---|---|---|---|---|---|---|---|---|
| Blend (parts by mass) | PPG (A) | 70 | 70 | 70 | 70 | 70 | 100 | 70 | 100 | 100 | 70 |
| | Catalyst (a) | 0.41 | 0.41 | 0.41 | 0.41 | 0.41 | 0.41 | 0.41 | 0.41 | 0.41 | 0.41 |
| | Catalyst (b) | 0.09 | 0.09 | 0.09 | 0.09 | 0.09 | 0.09 | 0.09 | 0.09 | 0.09 | 0.09 |
| | Foaming agent (H$_2$O) | 3.2 | 3.2 | 3.2 | 3.2 | 3.2 | 3.2 | 3.2 | 3.2 | 3.2 | 3.2 |
| | MDI (E) | — | — | — | — | — | — | — | — | — | 82.6 |
| | MDI (B) | 82.6 | 82.6 | 82.6 | — | — | — | 82.6 | — | — | — |

TABLE 2-continued

| | | Example B1 | Example B2 | Example B3 | Example B4 | Example B5 | Comparative Example B1 | Comparative Example B2 | Comparative Example B3 | Comparative Example B4 | Comparative Example B5 |
|---|---|---|---|---|---|---|---|---|---|---|---|
| | MDI (F) | — | — | — | 82.6 | — | — | — | — | — | — |
| | MDI (G) | — | — | — | — | 82.6 | — | — | — | — | — |
| | MDI (C) | — | — | — | — | — | 7.8 | — | 52.6 | 65.8 | — |
| | TDI (D) | — | — | — | — | — | 31.2 | — | — | — | — |
| | NCO INDEX | 100 | 100 | 100 | 100 | 100 | 100 | 100 | 100 | 125 | 100 |
| Foaming condition | Mold temperature (° C.) | 30 | 40 | 50 | 30 | 30 | 50 | 60 | 40 | 40 | 40 |
| Pulse NMR | T2 (μsec) of hard segment — First region | 39.1 | 34.2 | 33.4 | 38.9 | 39.5 | 15.0 | 28.3 | 16.7 | 15.9 | 25.4 |
| | T2 (μsec) of hard segment — Second region | 22.9 | 25.8 | 20.3 | 25.9 | 20.9 | 14.7 | 18.2 | 16.5 | 15.6 | 18.7 |
| | Volume abundance ratio (%) of hard segment — First region | 24.5 | 27.0 | 30.8 | 23.5 | 23.0 | 36.1 | 33.6 | 27.7 | 31.9 | 34.6 |
| | Volume abundance ratio (%) of hard segment — Second region | 19.7 | 22.4 | 18.6 | 25.4 | 30.6 | 37.5 | 35.9 | 25.2 | 33.5 | 38.7 |
| Asker F hardness | First region (F1) | 35 | 37 | 39 | 28 | 18 | 61 | 54 | 56 | 57 | 58 |
| | Second region (F2) | 51 | 53 | 51 | 55 | 58 | 55 | 57 | 58 | 59 | 60 |
| | |(F1) − (F2)| | 16 | 16 | 12 | 27 | 40 | 6 | 3 | 2 | 2 | 2 |
| Density (kg/m³) | Second region | 59.8 | 60.1 | 60.5 | 62.3 | 62.4 | 60.3 | 61.5 | 62.4 | 62.3 | 60.1 |
| | Impact resilience (%) | 39 | 44 | 49 | 37 | 38 | 68 | 51 | 63 | 72 | 54 |
| | Hysteresis loss (%) | 13.7 | 10.9 | 19.1 | 14.5 | 18.2 | 24.7 | 21.3 | 27.8 | 24.1 | 20.4 |
| | Logarithmic decrement | 2.71 | 2.16 | 1.73 | 2.75 | 2.06 | 0.89 | 1.56 | 1.50 | 0.86 | 1.65 |
| | Compression permanent set (%) 50° C., 95% RH, 22 hr | 0.2 | 0.1 | 0.1 | 0.2 | 0.3 | 11.3 | 0.9 | 5.1 | 8.1 | 1.5 |

In the foamed urethanes obtained in Comparative Examples B1 to B5, the spin-spin relaxation time (T2) of the hard segment by $H^1$ pulse NMR measurement under vacuum is less than 30 μsec in the first region and less than 20 μsec in the second region. In the first region, the volume abundance ratio of the hard segment is all 27% or more, and in the second region, the volume abundance ratio exceeds 25%, which is relatively large.

For this reason, the foamed urethanes obtained in Comparative Examples B1 to B5 are predicted to have a dense structure in which a urea bond aggregate structure has developed greatly. As a result, the foamed urethane obtained in Comparative Examples B1 to B5 is considered to have high Asker F hardness in both the first region and the second region. It is considered that the impact resilience is high, and hysteresis loss and compression permanent set are high. Furthermore, it is considered that the logarithmic decrement is low.

Therefore, the foamed urethane obtained in Comparative Examples B1 to B5 is inferior in soft touch, body pressure dispersibility (fit feeling), and vibration absorbing property when used as a vehicle seat cushion material (especially car seat cushion material). Bottom tipping feeling and foreign body feeling are likely to emerge.

Therefore, a seat cushion material using the foamed urethane obtained in each Comparative Example is inferior in riding comfort.

On the other hand, in the foamed urethane obtained in Examples B1 to B5, the spin-spin relaxation time (T2) of the hard segment by $H^1$ pulse NMR measurement under vacuum at 25±1° C. is from 30 μsec to 40 μsec in the first region and from 20 μsec to less than 30 μsec in the second region. The volume abundance ratios of hard segments in the first region and the second region are both 40% or less.

Therefore, it is predicted that the foamed urethane obtained in Examples B1 to B5 has a structure in which urea bond aggregate structures are suppressed to a small amount. As a result, it is considered that the foamed urethane obtained in Examples B1 to B5 has a low Asker F hardness of the first region arranged on the side of an occupant, in particular, and that the absolute value of the difference in Asker F hardness between the first region and the second region is large. It is considered that the impact resilience is lower than that of each Comparative Example, and the hysteresis loss and compression permanent set are lower. Furthermore, it is considered that the logarithmic decrement is higher than that of each Comparative Example.

Therefore, when the foamed urethanes obtained in Examples B1 to B5 are used as a vehicle seat cushion material (especially car seat cushion material), they are excellent in soft touch, body pressure dispersibility (fit feeling) and vibration absorbing property. Bottom tipping feeling and foreign body feeling are suppressed.

As described above, the seat cushion material using the foamed urethane obtained in Examples B1 to B5 is superior in riding comfort to a conventional seat cushion material.

What is claimed is:

1. A cushion material comprising:
   a foamed urethane comprising a hard segment and a soft segment,
   wherein the foamed urethane is a reaction cured product formed using a mixed raw material that comprises a polyol component and an isocyanate component of a diphenylmethane diisocyanate compound,
   wherein the isocyanate component is an isocyanate terminal-modified polyisocyanate obtained by reacting a mixture of monomeric diphenylmethane diisocyanate and polymeric diphenylmethane diisocyanate with a portion of the polyol component,
   wherein a mass ratio of the monomeric diphenylmethane diisocyanate with respect to the polymeric diphenylmethane diisocyanate (monomeric diphenylmethane diisocyanate/polymeric diphenylmethane diisocyanate) is in a range of from 3/7 to 9/1, wherein the polyol component is an ether-based polyol and has a weight average molecular weight per functional group of an active hydrogen group (OH group) of from 2,000 to 3,000, and wherein a spin-spin relaxation time (T2) of the hard segment in the foamed urethane is from 20 μsec to 40 μsec, and a volume abundance ratio of the hard segment is from 5% to 40% in a $H^1$ solid-state pulse NMR measurement.

2. The cushion material according to claim 1, wherein the cushion material is a vehicle seat cushion material.

3. The cushion material according to claim 1, wherein the cushion material is a car seat cushion material.

4. A cushion material comprising:
a foamed urethane comprising a hard segment and a soft segment,
wherein the foamed urethane is a reaction cured product formed using a mixed raw material that comprises a polyol component and an isocyanate component of a diphenylmethane diisocyanate compound,
wherein the isocyanate component is an isocyanate terminal-modified polyisocyanate obtained by reacting a mixture of monomeric diphenylmethane diisocyanate and polymeric diphenylmethane diisocyanate with a portion of the polyol component,
wherein a mass ratio of the monomeric diphenylmethane diisocyanate with respect to the polymeric diphenylmethane diisocyanate (monomeric diphenylmethane diisocyanate/polymeric diphenylmethane diisocyanate) is in a range of from 3/7 to 9/1,
wherein the polyol component is an ether-based polyol and has a weight average molecular weight per functional group of an active hydrogen group (OH group) of from 2,000 to 3,000, and
wherein a compression permanent set of the foamed urethane after 50% compression for 22 hours under conditions of a temperature of 50° C. and a relative humidity of 95% is 1% or less.

5. The cushion material according to claim 4, wherein the cushion material is a vehicle seat cushion material.

6. The cushion material according to claim 4, wherein the cushion material is a car seat cushion material.

7. A seat cushion material comprising:
a foamed urethane which is a reaction cured product formed using a mixed raw material that comprises a polyol component and an isocyanate component of a diphenylmethane diisocyanate compound and which comprises a hard segment and a soft segment,
wherein the isocyanate component is an isocyanate terminal-modified polyisocyanate obtained by reacting a mixture of monomeric diphenylmethane diisocyanate and polymeric diphenylmethane diisocyanate with a portion of the polyol component,
wherein a mass ratio of the monomeric diphenylmethane diisocyanate with respect to the polymeric diphenylmethane diisocyanate (monomeric diphenylmethane diisocyanate/polymeric diphenylmethane diisocyanate) is in a range of from 30/70 to 90/10,
wherein the polyol component is an ether-based polyol and has a weight average molecular weight per functional group of an active hydrogen group (OH group) of from 2,000 to 3,000, and
wherein the foamed urethane comprises:
a first region in which a spin-spin relaxation time (T2) of the hard segment is from 30 μsec to 40 μsec, and a volume abundance ratio of the hard segment is from 10% to 40% in a $H^1$ solid-state pulse NMR measurement; and
a second region in which the spin-spin relaxation time (T2) of the hard segment is from 20 μsec to less than 30 μsec, and the volume abundance ratio of the hard segment is from 5% to 40% in the $H^1$ solid-state pulse NMR measurement, and which is adjacent to the first region.

8. The seat cushion material according to claim 7, wherein an Asker F hardness of the first region is from 20 to less than 50, and an Asker F hardness of the second region is from 50 to 70.

9. The seat cushion material according to claim 8, wherein when the Asker F hardness in the first region is F1 and the Asker F hardness in the second region is F2, an absolute value of a difference between F1 and F2 is from 10 to 50.

10. The seat cushion material according to claim 7, wherein the seat cushion material is for a vehicle.

11. The seat cushion material according to claim 7, wherein the seat cushion material is for a car.

12. A seat comprising:
a seat portion for supporting buttocks of a seated occupant; and
a backrest portion for supporting a back portion and a waist portion of a seated occupant,
wherein at least one of the seat portion or the backrest portion includes the seat cushion material according to claim 7.

* * * * *